United States Patent
Farmer et al.

(10) Patent No.: US 8,066,842 B2
(45) Date of Patent: Nov. 29, 2011

(54) METHOD AND APPARATUS FOR MANUFACTURING A COMPOSITE MATERIAL

(75) Inventors: Benjamin Lionel Farmer, Bristol (GB); Daniel Mark Johns, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/733,053

(22) PCT Filed: Aug. 4, 2008

(86) PCT No.: PCT/GB2008/050655
§ 371 (c)(1),
(2), (4) Date: Feb. 4, 2010

(87) PCT Pub. No.: WO2009/019510
PCT Pub. Date: Feb. 12, 2009

(65) Prior Publication Data
US 2010/0143715 A1  Jun. 10, 2010

(30) Foreign Application Priority Data
Aug. 6, 2007 (GB) .................................. 0715164.0

(51) Int. Cl.
*B05D 1/18* (2006.01)
*C08F 2/46* (2006.01)
(52) U.S. Cl. ...... 156/296; 977/786; 977/890; 427/430.1
(58) Field of Classification Search .................. 156/296; 977/778, 784–787, 890; 427/430.1
See application file for complete search history.

(56) References Cited

U.S. PATENT DOCUMENTS

| 4,560,603 | A | * | 12/1985 | Giacomel | 428/86 |
| 6,180,049 | B1 | | 1/2001 | Jang et al. | |
| 6,428,890 | B1 | | 8/2002 | Ting | |
| 6,808,746 | B1 | | 10/2004 | Dai et al. | |
| 7,601,421 | B2 | * | 10/2009 | Khabashesku et al. | 428/297.4 |
| 7,662,467 | B2 | * | 2/2010 | Li et al. | 428/298.4 |
| 2002/0053257 | A1 | | 5/2002 | Brice et al. | |
| 2003/0094734 | A1 | | 5/2003 | Deckard et al. | |
| 2005/0127030 | A1 | | 6/2005 | Watanabe et al. | |
| 2006/0166003 | A1 | * | 7/2006 | Khabashesku et al. | 428/413 |

(Continued)

FOREIGN PATENT DOCUMENTS
EP  0 467 100  1/1992
(Continued)

OTHER PUBLICATIONS

International Search Report for PCT/GB2008/050655, mailed Dec. 2, 2008.

(Continued)

*Primary Examiner* — Matthew Daniels
*Assistant Examiner* — Scott W Dodds
(74) *Attorney, Agent, or Firm* — Nixon & Vanderhye P.C.

(57) ABSTRACT

A method of manufacturing a composite material, the method comprising: providing a first layer (14) of CNTs reinforcement elements (13) with liquid matrix material in interstitial gaps between the reinforcement elements; dipping a second layer of reinforcement elements into the liquid matrix material in the interstitial gaps such that the reinforcement elements in the second layer become partially embedded in the first layer of reinforcement elements and partially protrude from the first layer of reinforcement elements, impregnating the protruding parts of the reinforcement elements in the second layer with liquid matrix material; and curing the liquid matrix material.

17 Claims, 46 Drawing Sheets

U.S. PATENT DOCUMENTS

| | | | |
|---|---|---|---|
| 2006/0234056 A1 | 10/2006 | Huang | |
| 2007/0128960 A1 | 6/2007 | Ghasemi et al. | |
| 2008/0075954 A1* | 3/2008 | Wardle et al. | 428/339 |
| 2008/0274323 A1 | 11/2008 | Raby et al. | |
| 2009/0169825 A1 | 7/2009 | Farmer et al. | |
| 2009/0311166 A1* | 12/2009 | Hart et al. | 423/445 B |
| 2010/0004388 A1 | 1/2010 | Farmer et al. | |

FOREIGN PATENT DOCUMENTS

| | | |
|---|---|---|
| EP | 1 443 508 | 8/2004 |
| JP | 2006-290736 | 10/2006 |
| JP | 2007-144737 | 6/2007 |
| WO | WO 2008/000045 | 1/2008 |

OTHER PUBLICATIONS

Written Opinion of the International Searching Authority for PCT/GB2008/050655, mailed Dec. 2, 2008.

UK Search Report for GB 0715164.0, dated Dec. 7, 2007.

Anastasios, J.H. et al., "Chemical mechanical, and Thermal Control of substrate-Bound Nanotube Growth", Extended Abstract of Doctoral Thesis, (Dec. 31, 2006), pp. 1-14.

Garcia, E.J. et al., "Fabrication of composite microstructures by capillary-driven wetting of aligned carbon nanotubes with polymers", Nanotechnology, vol. 18, (Jan. 1, 2007), pp. 1-11.

Windle, A.H., "Two defining moments: A personal view of Prof. Alan H. Windle", Composites Science and Technology, vol. 67, (2007), pp. 929-930.

* cited by examiner

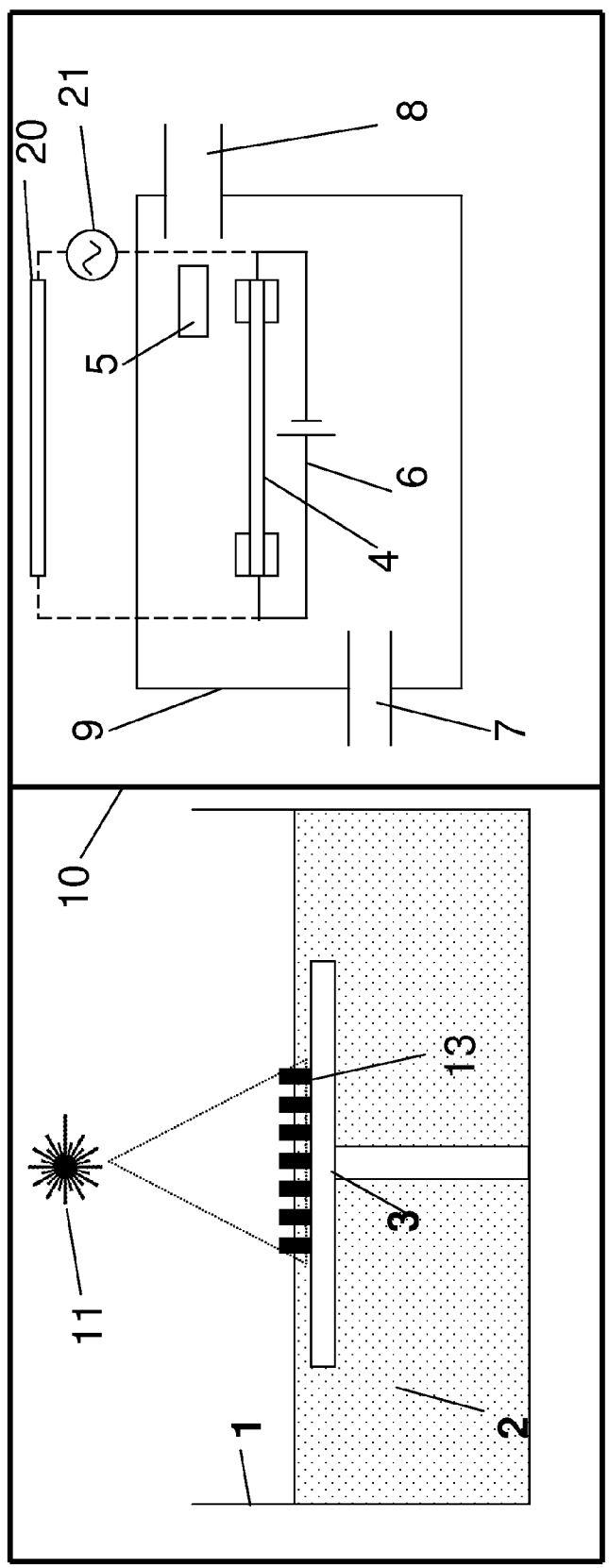

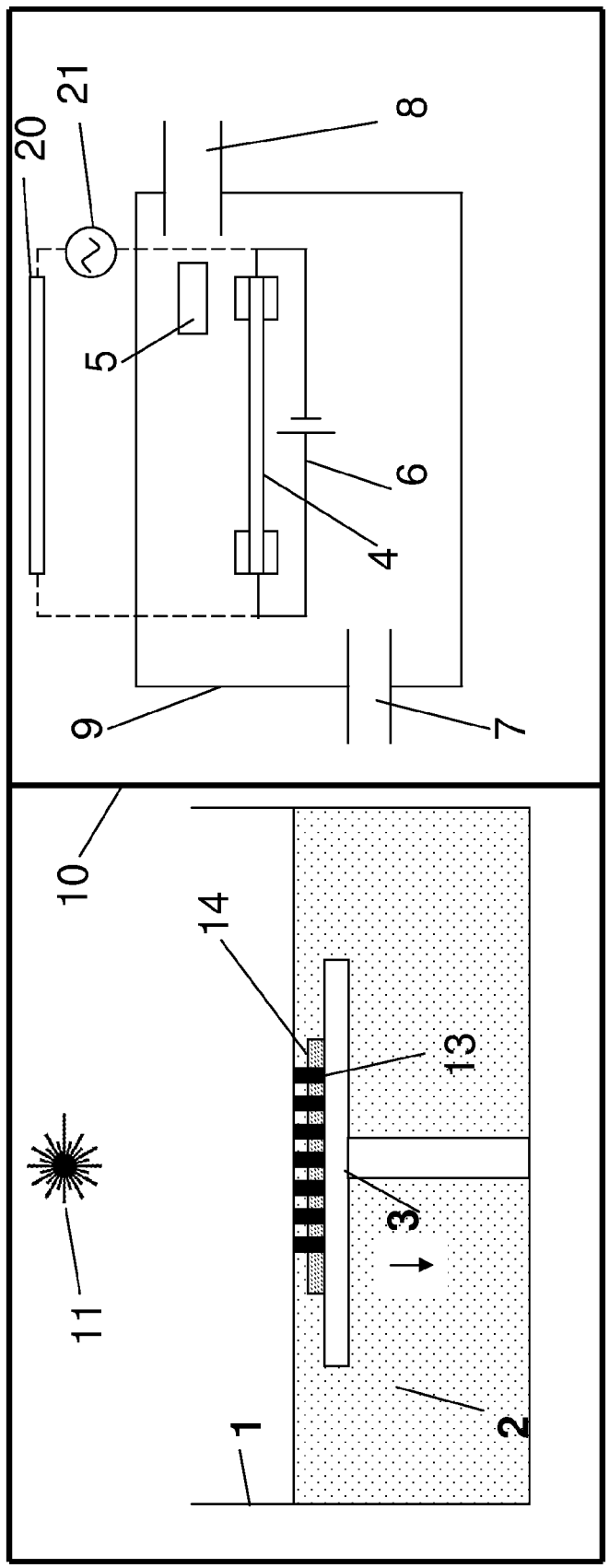

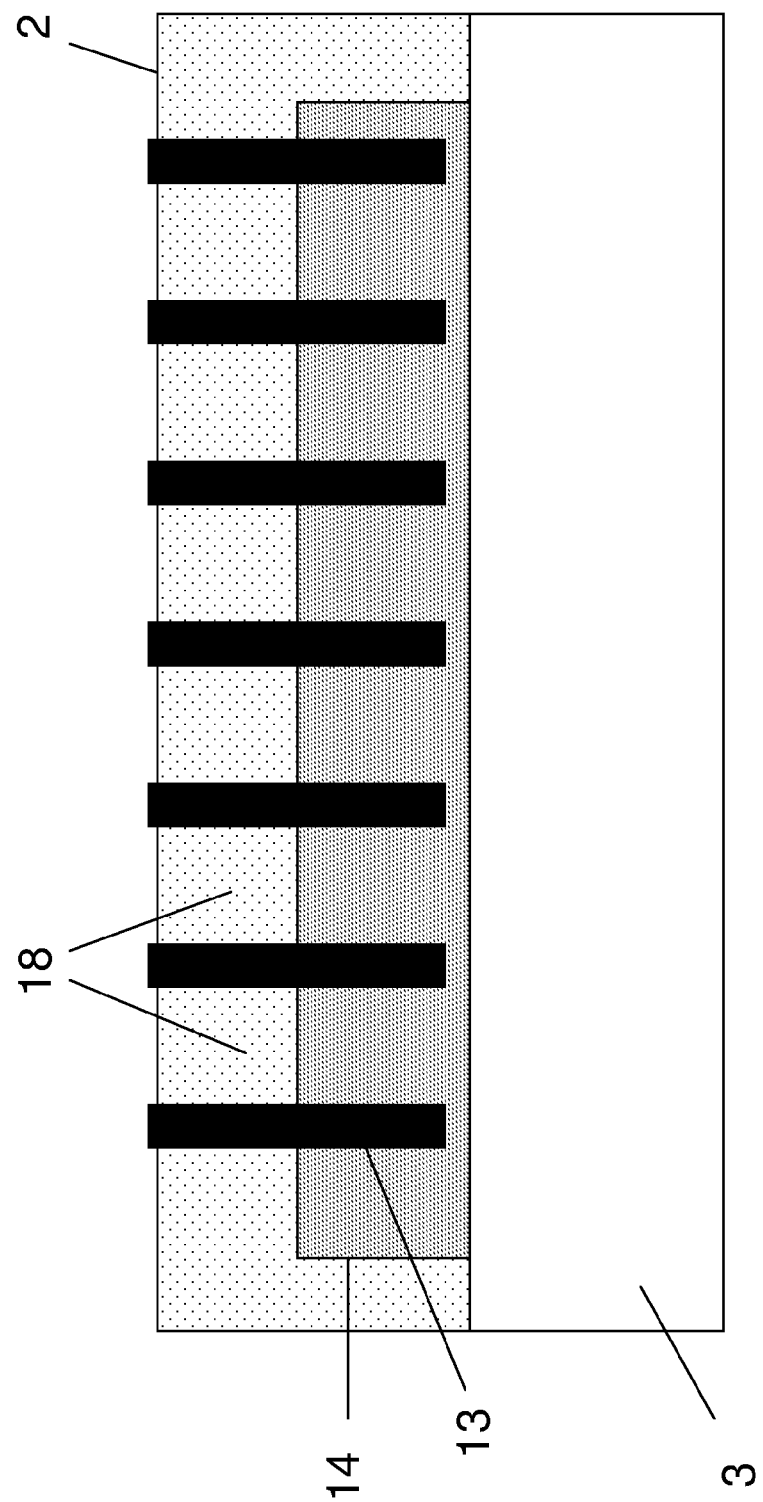

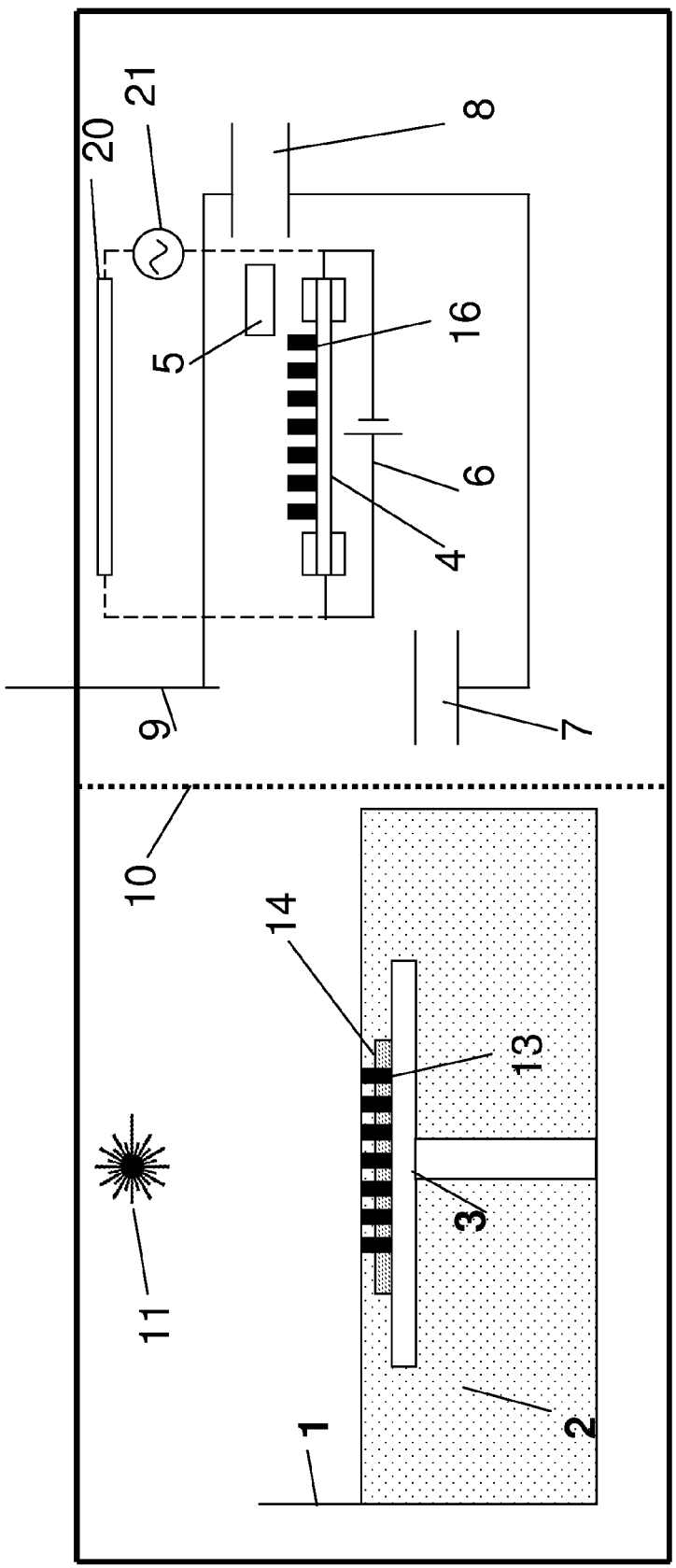

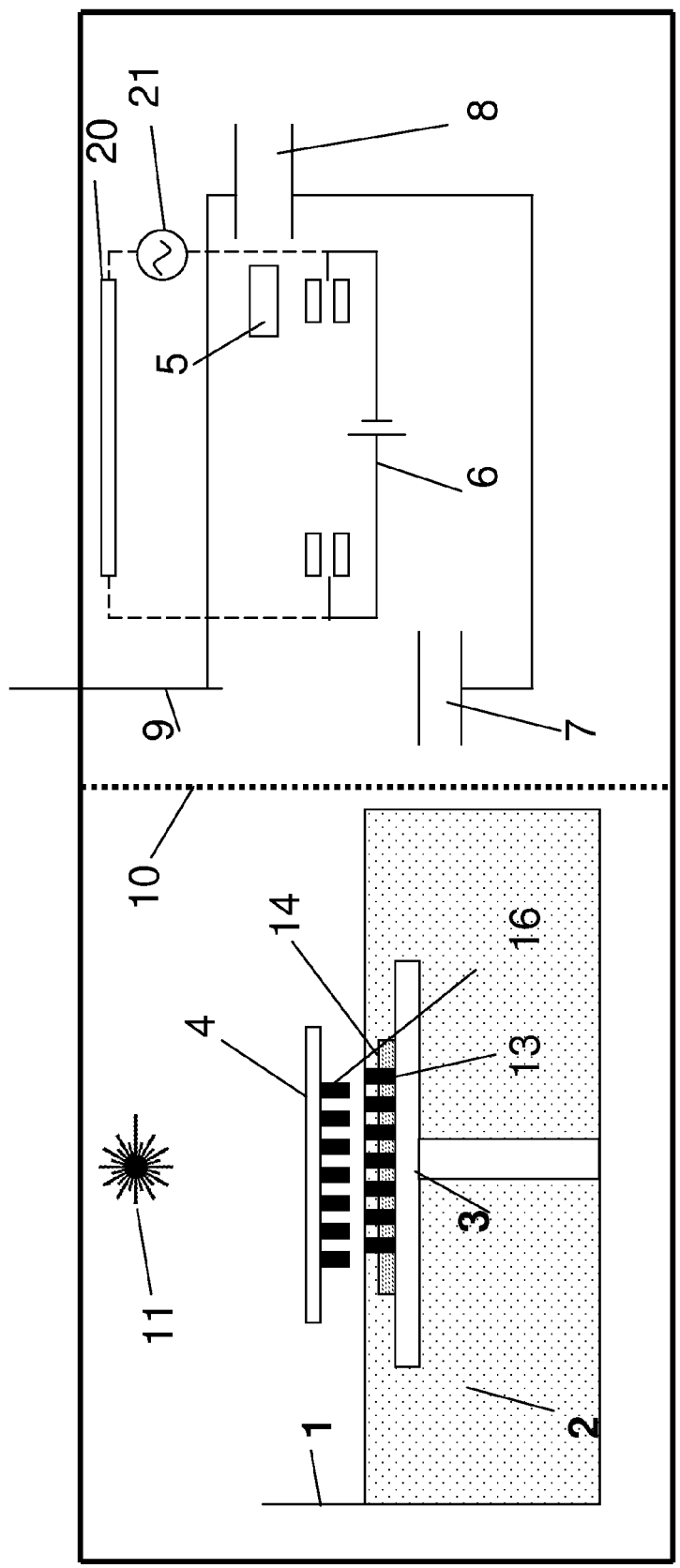

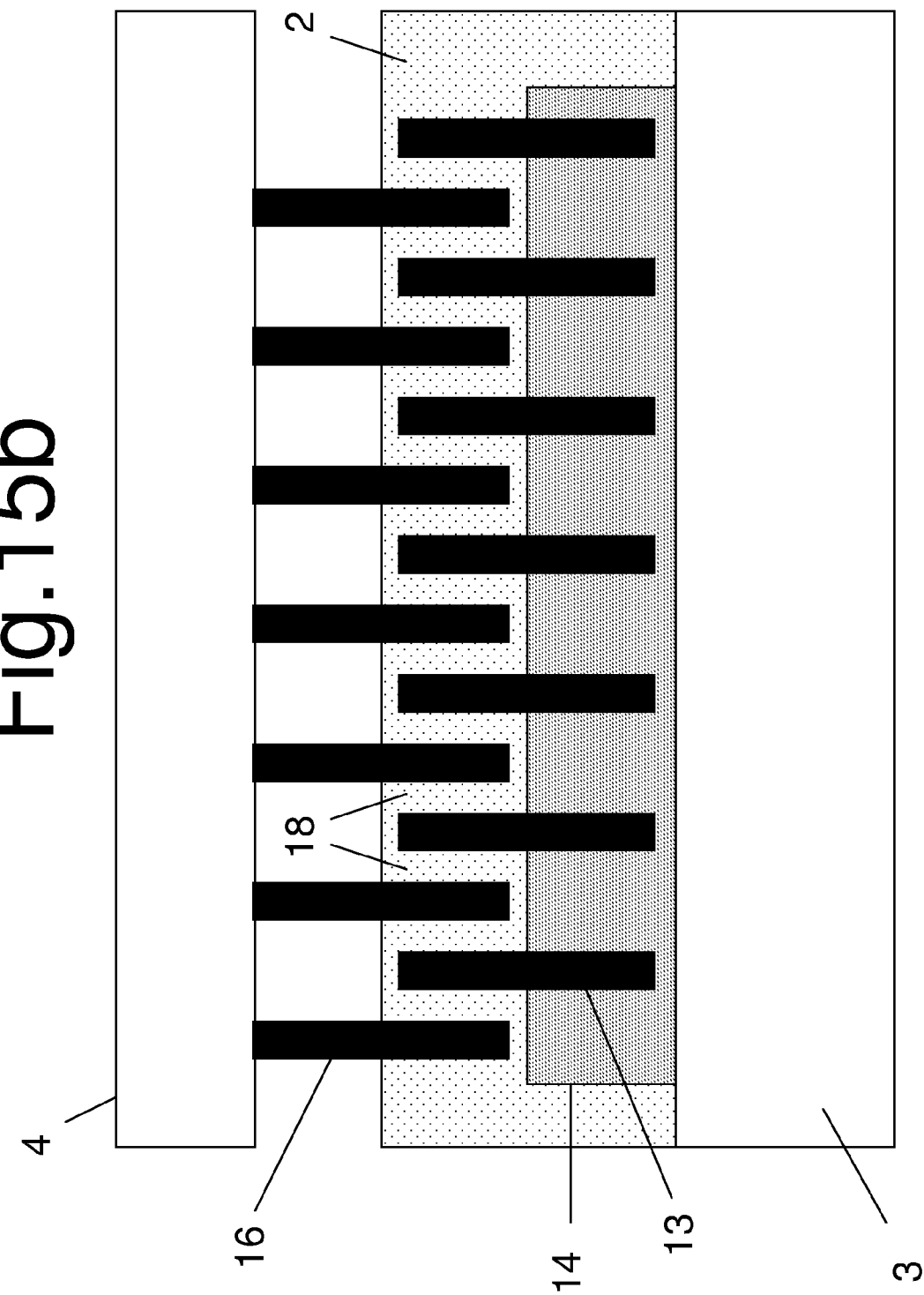

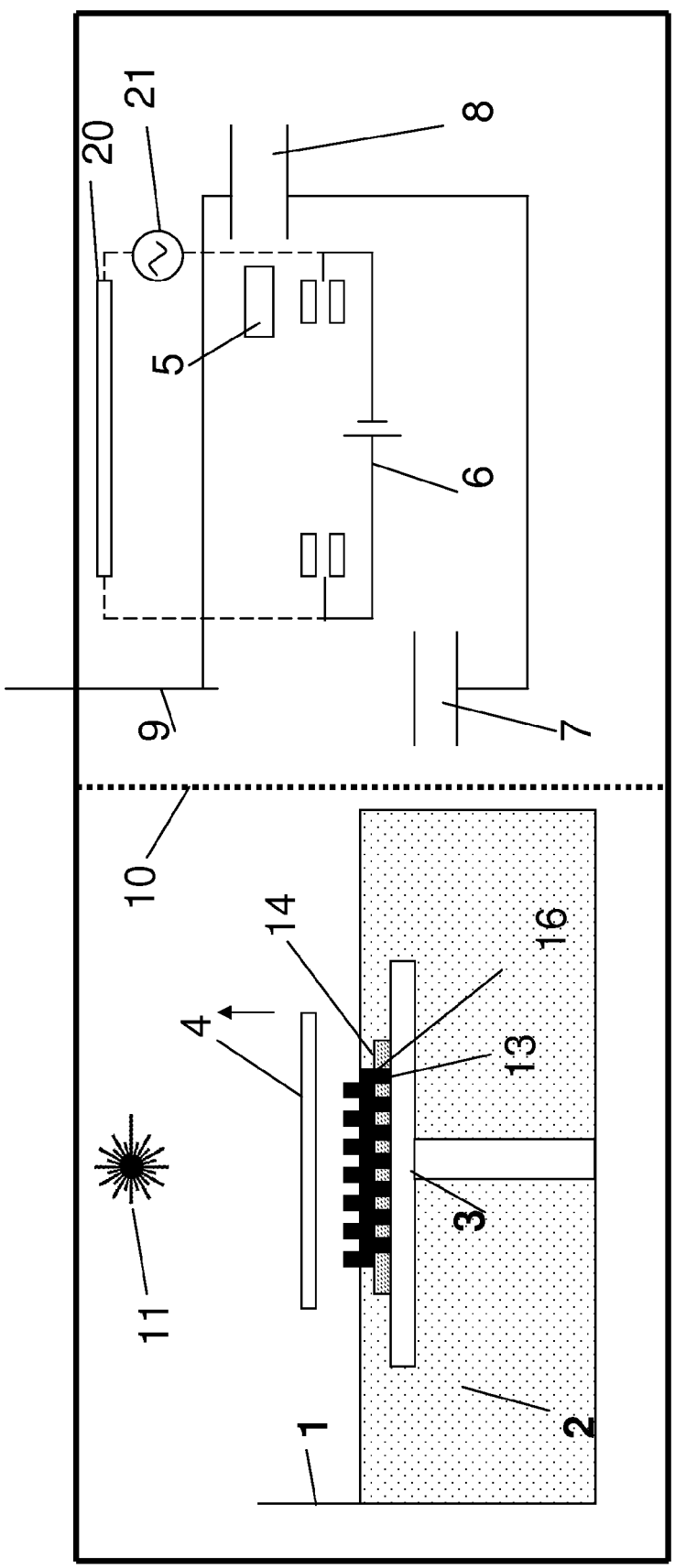

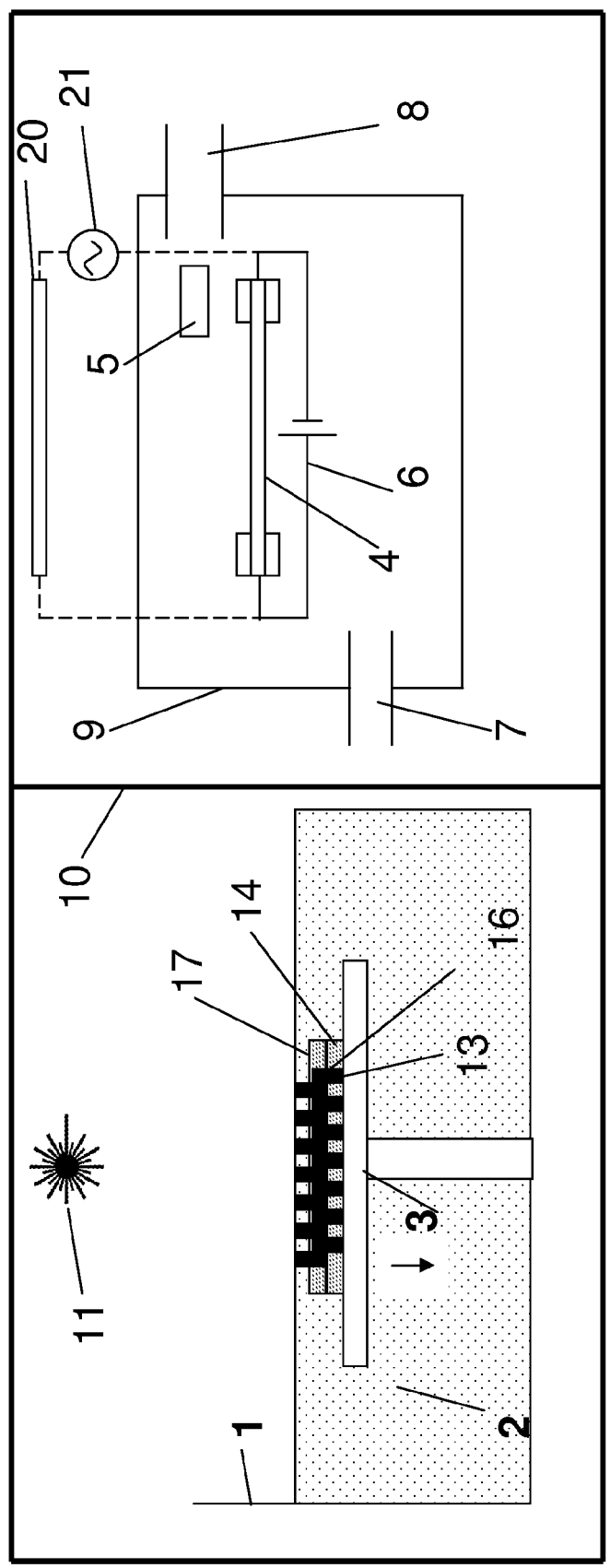

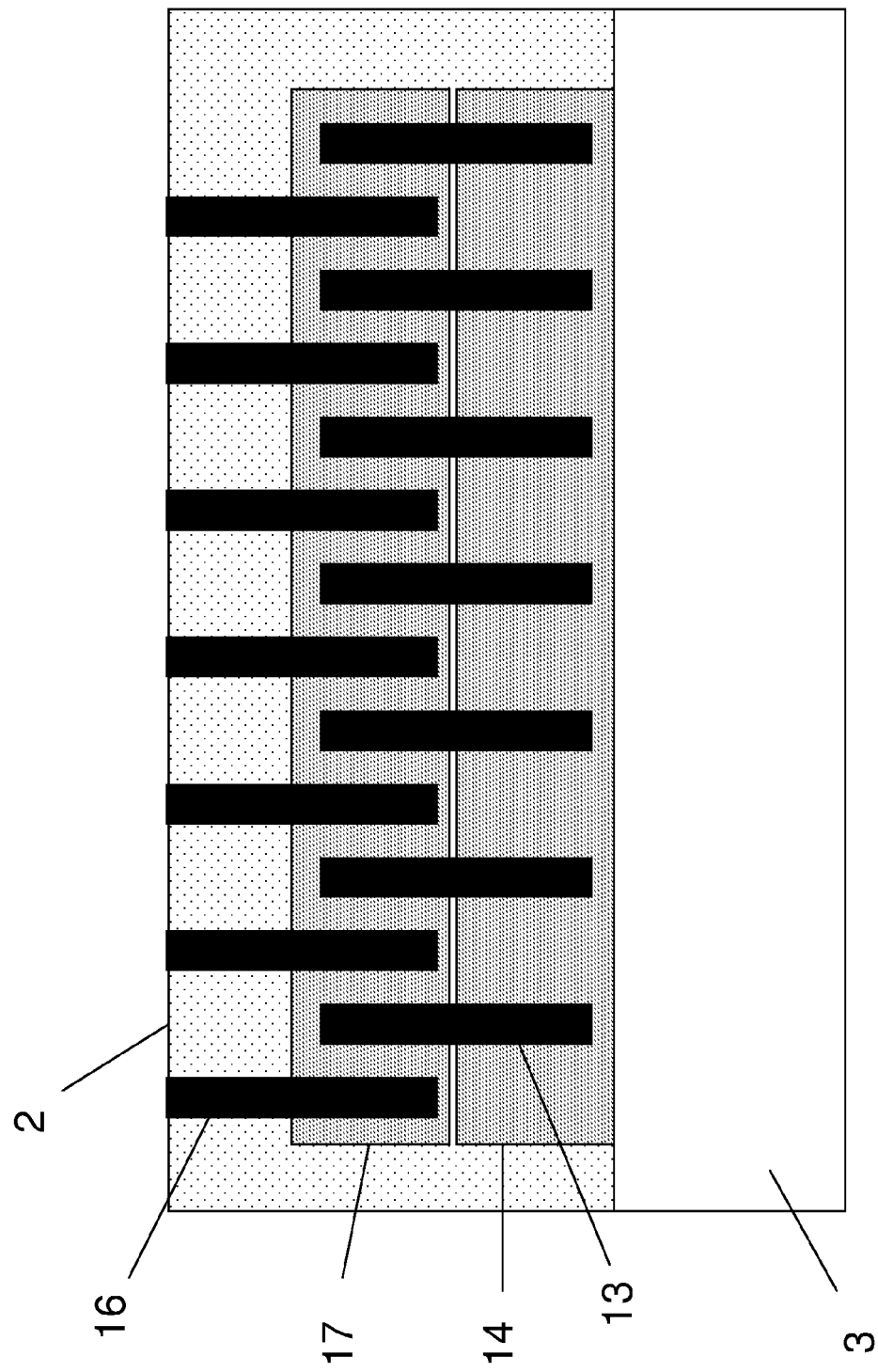

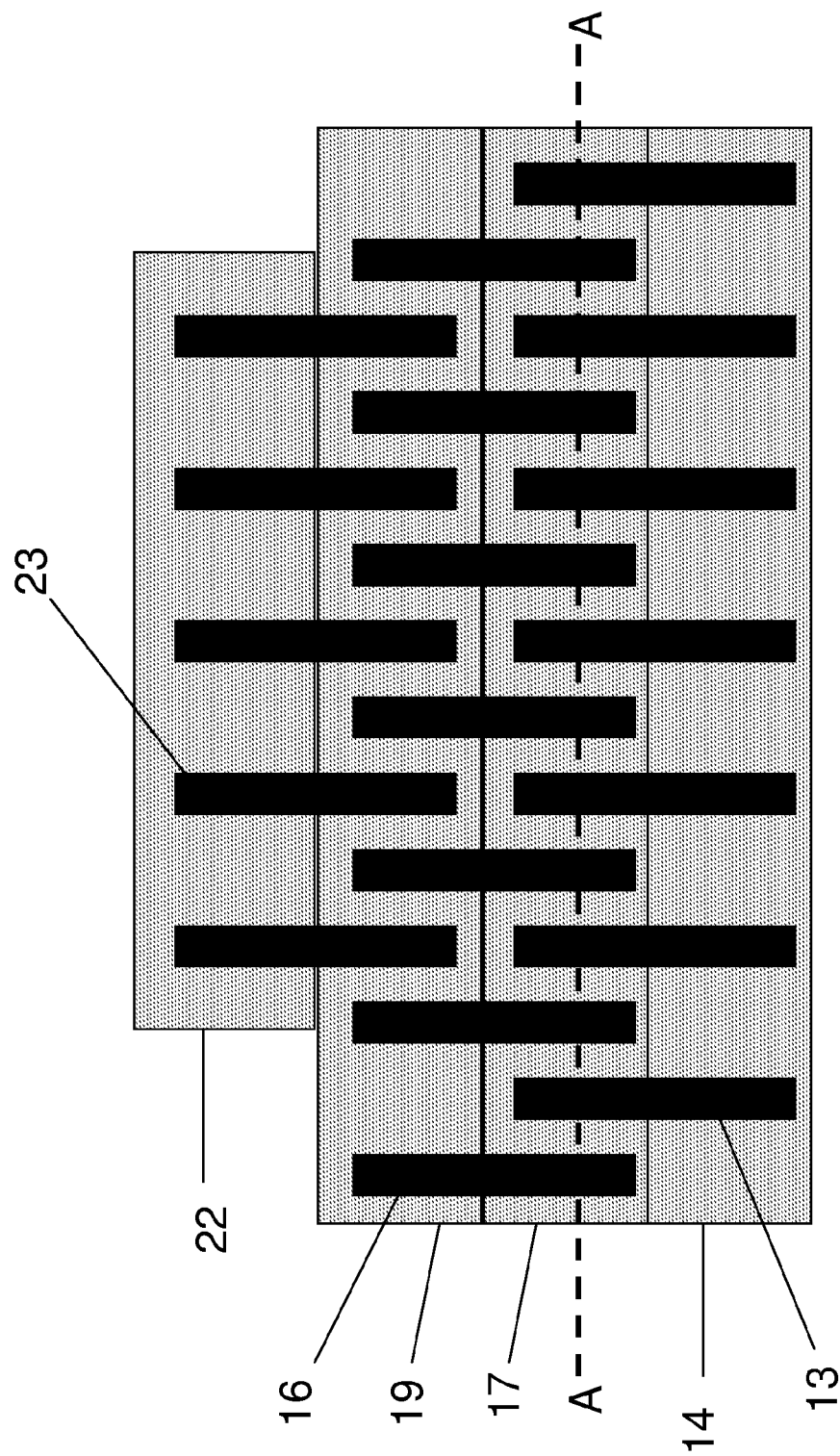

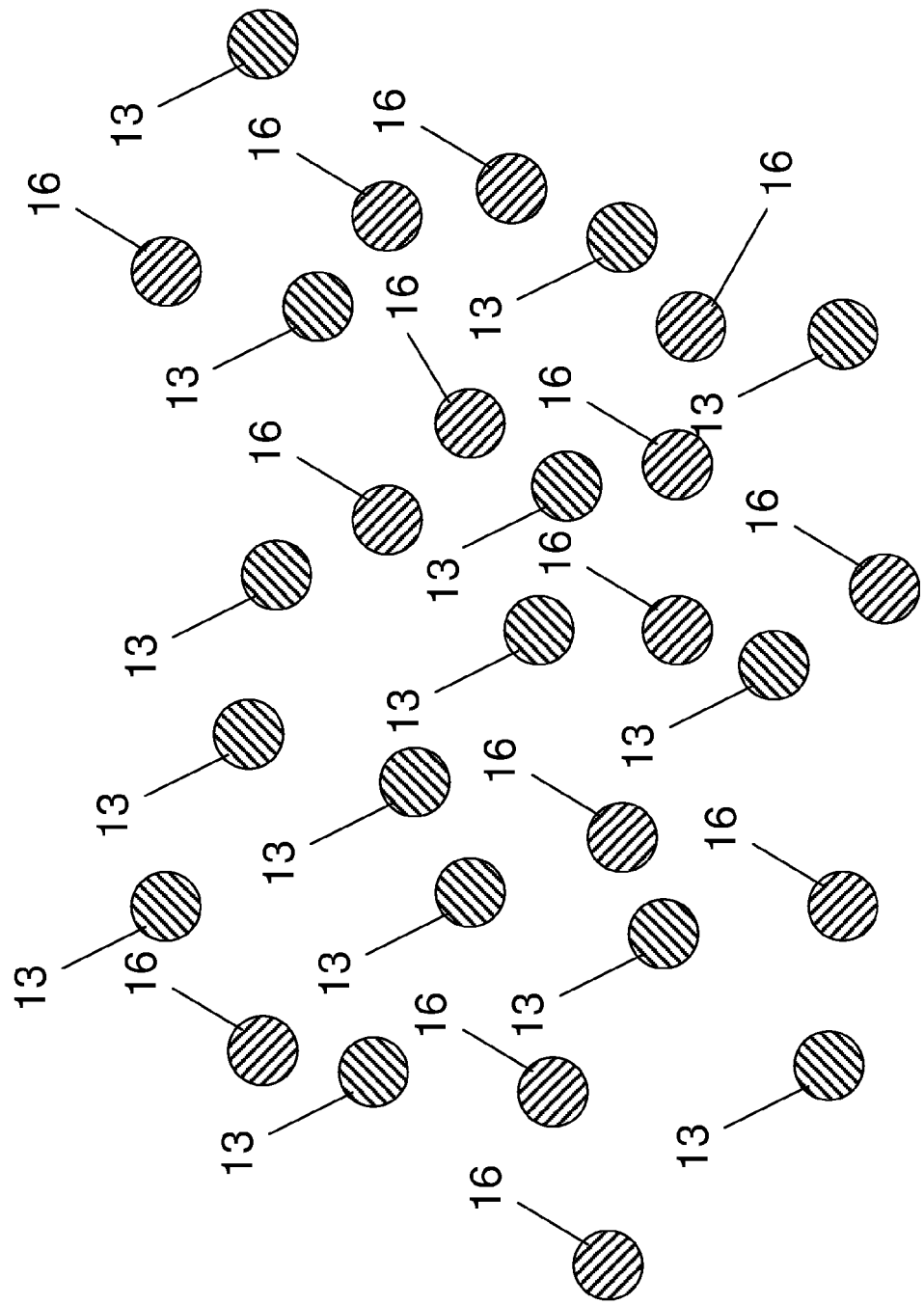

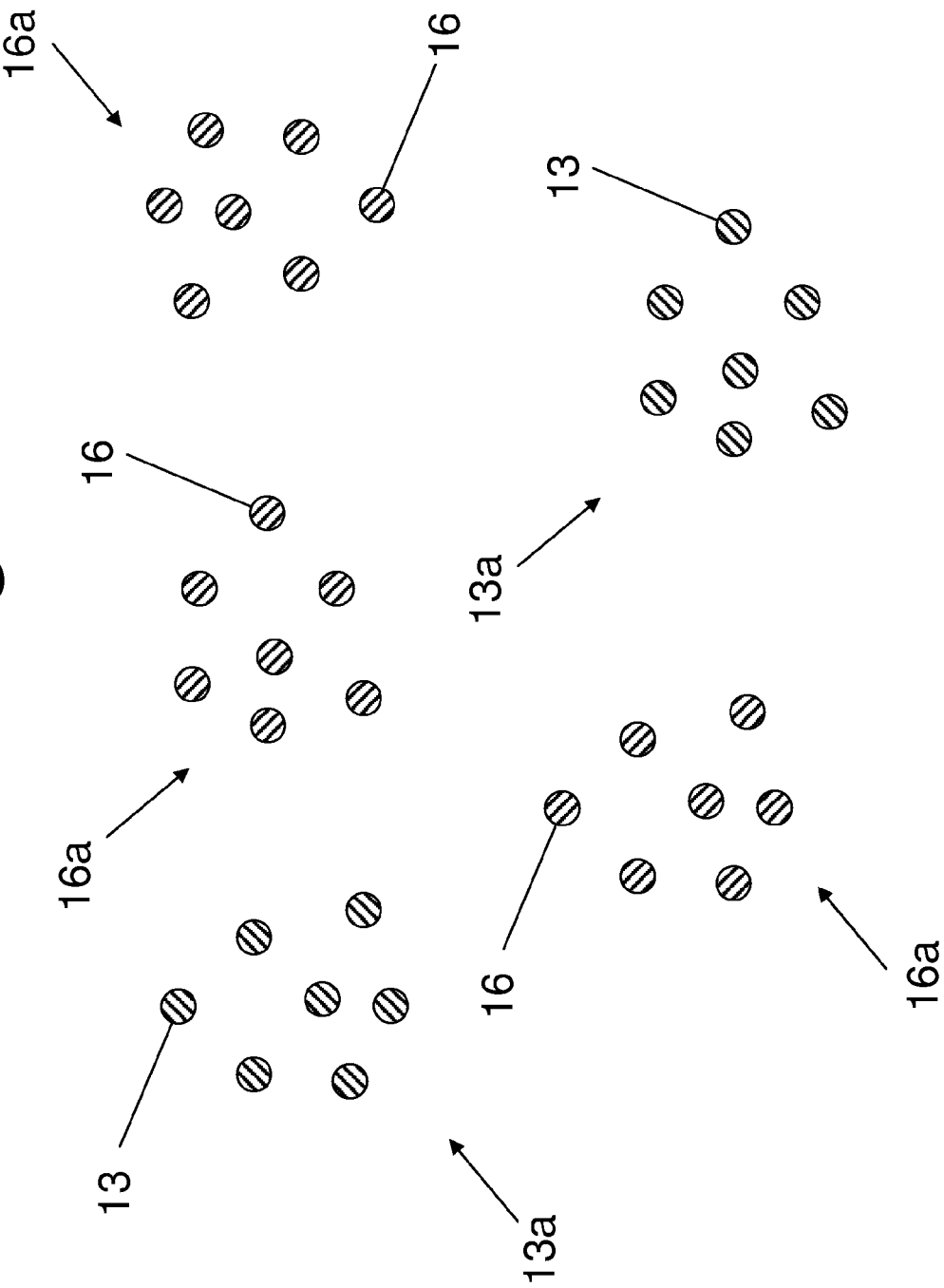

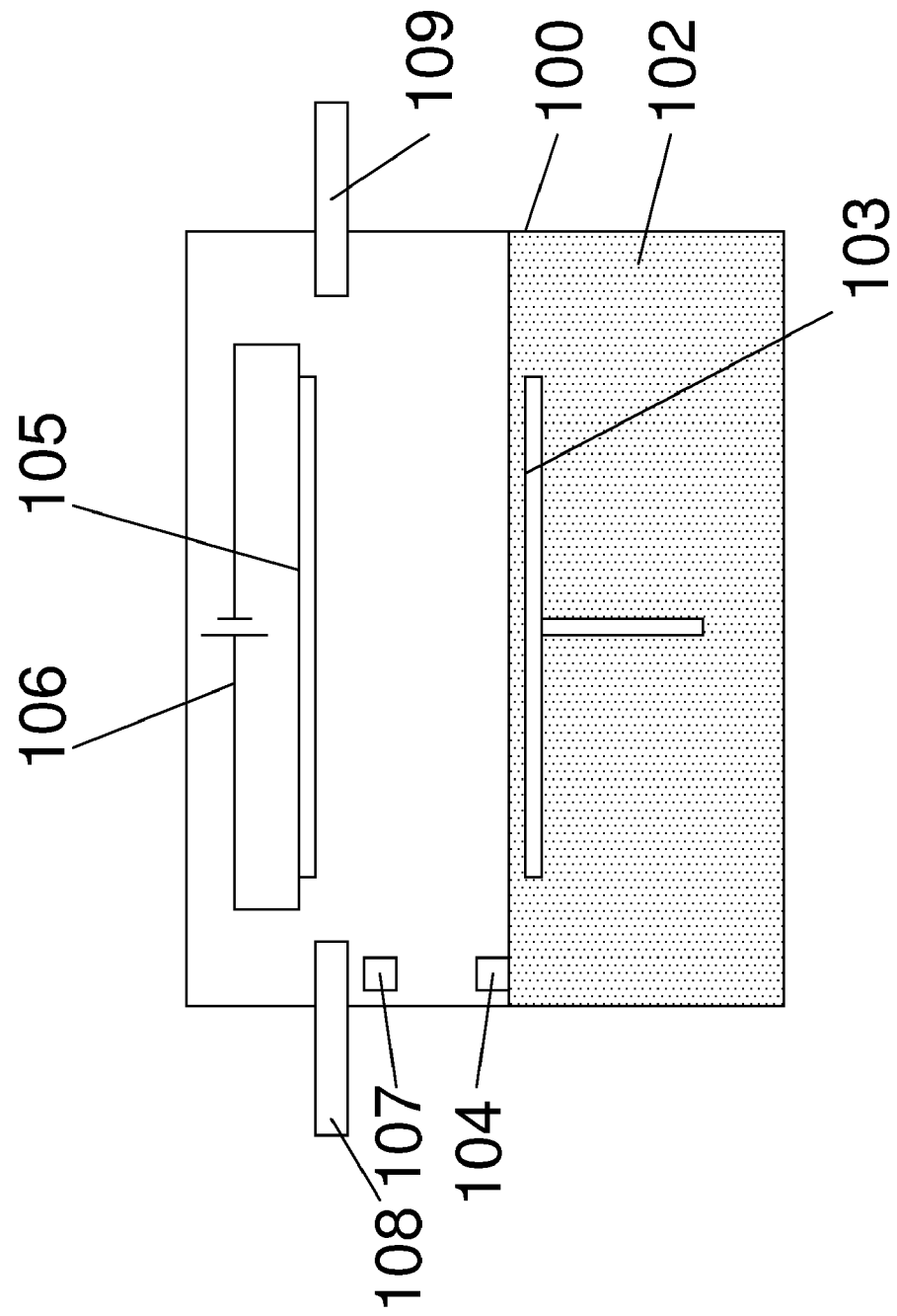

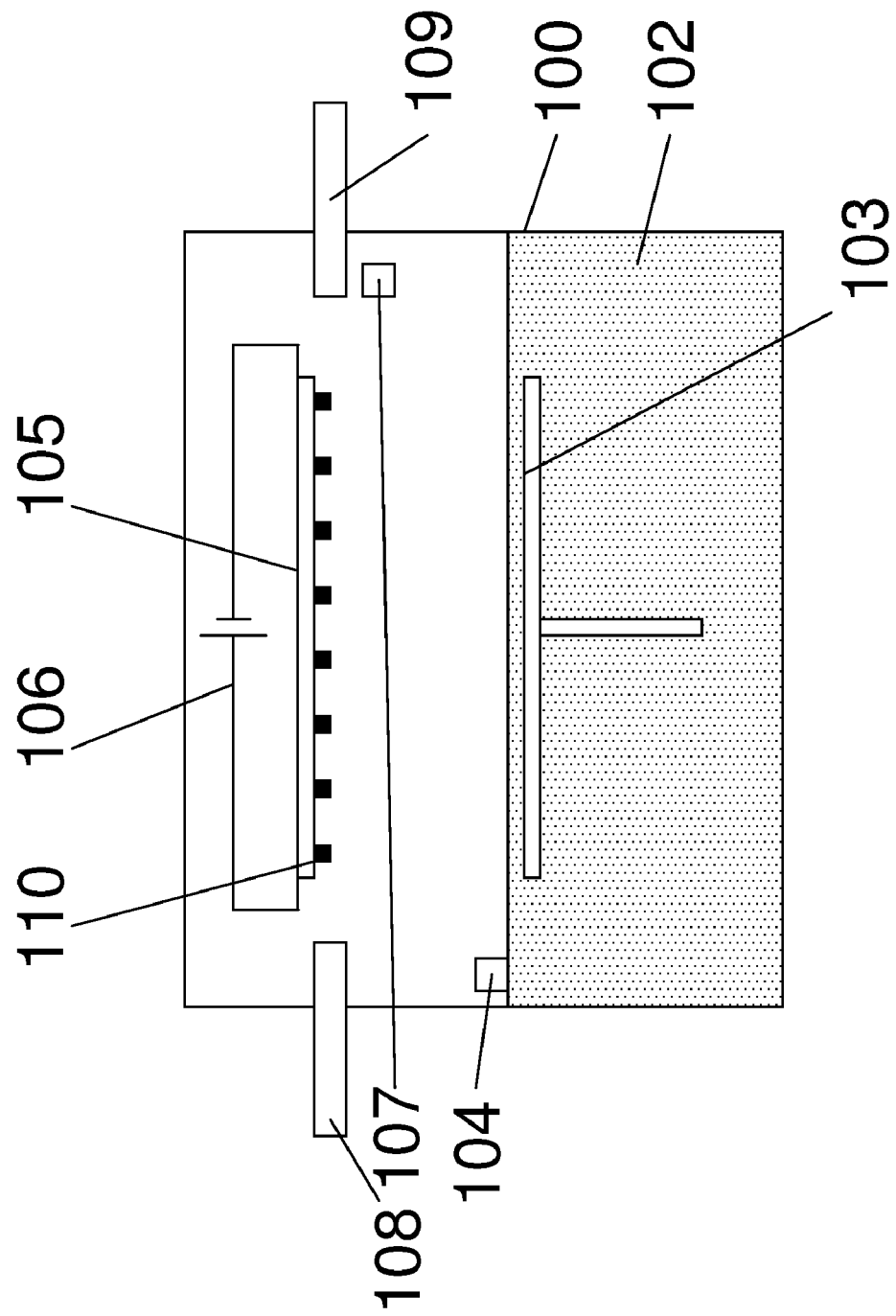

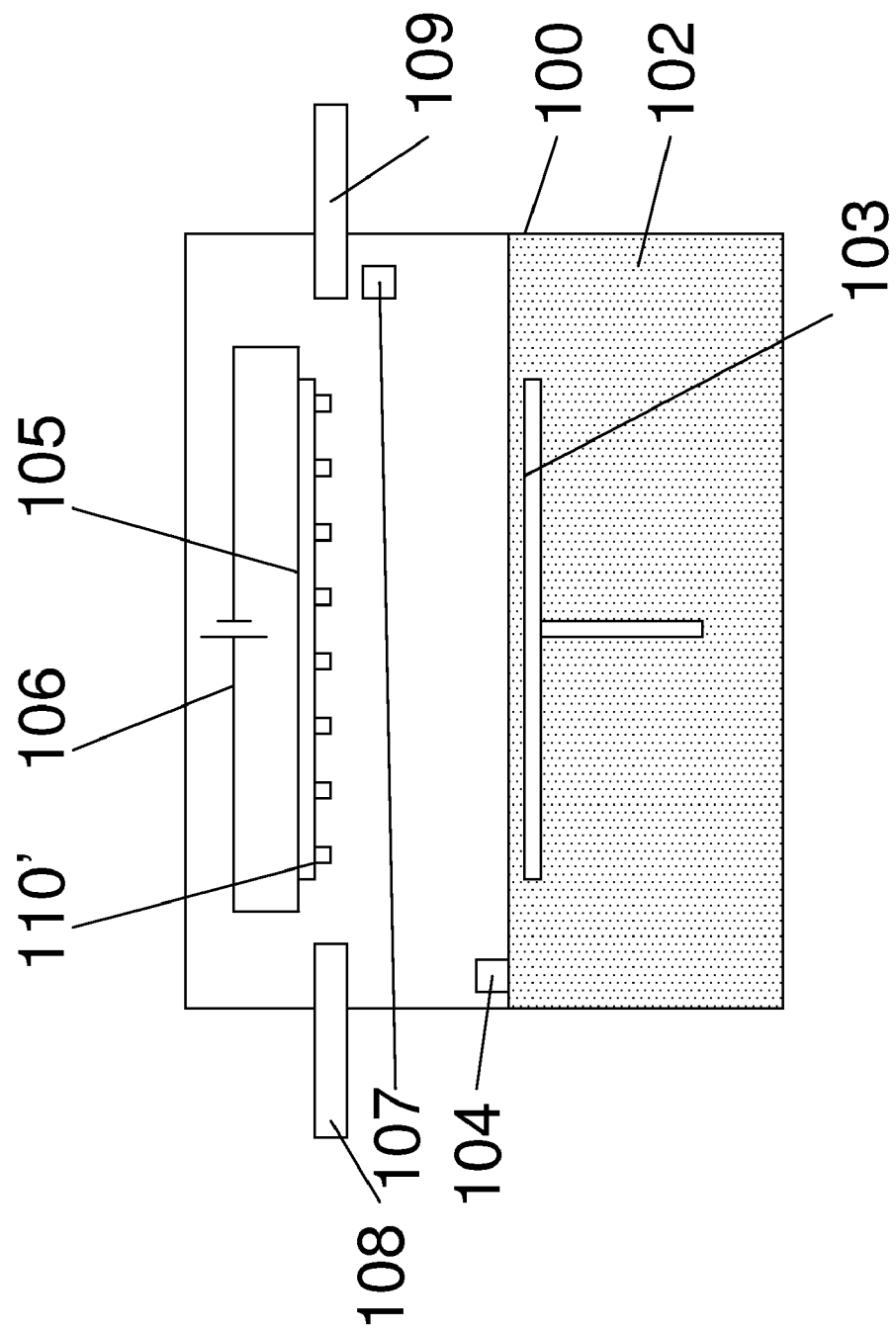

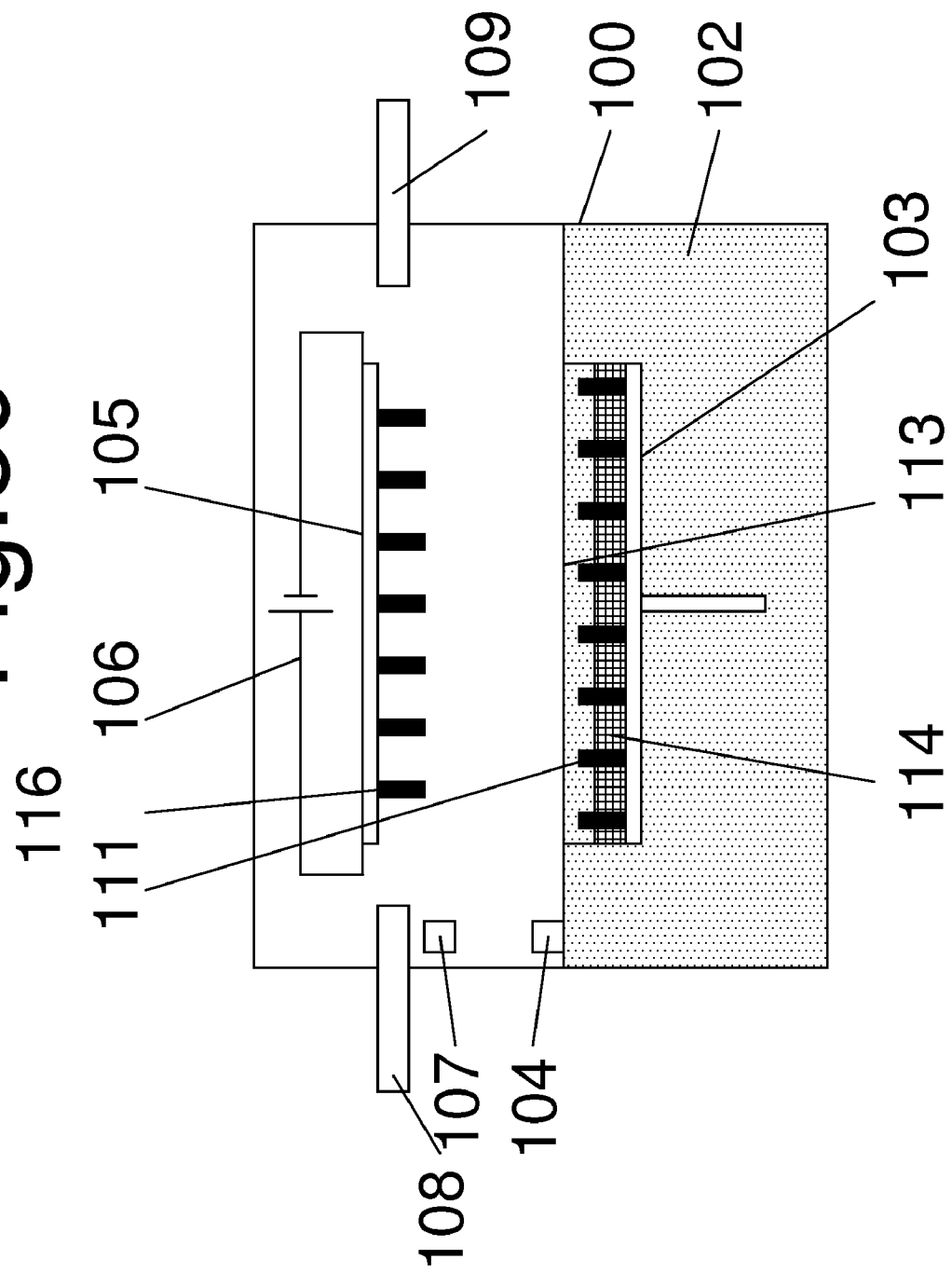

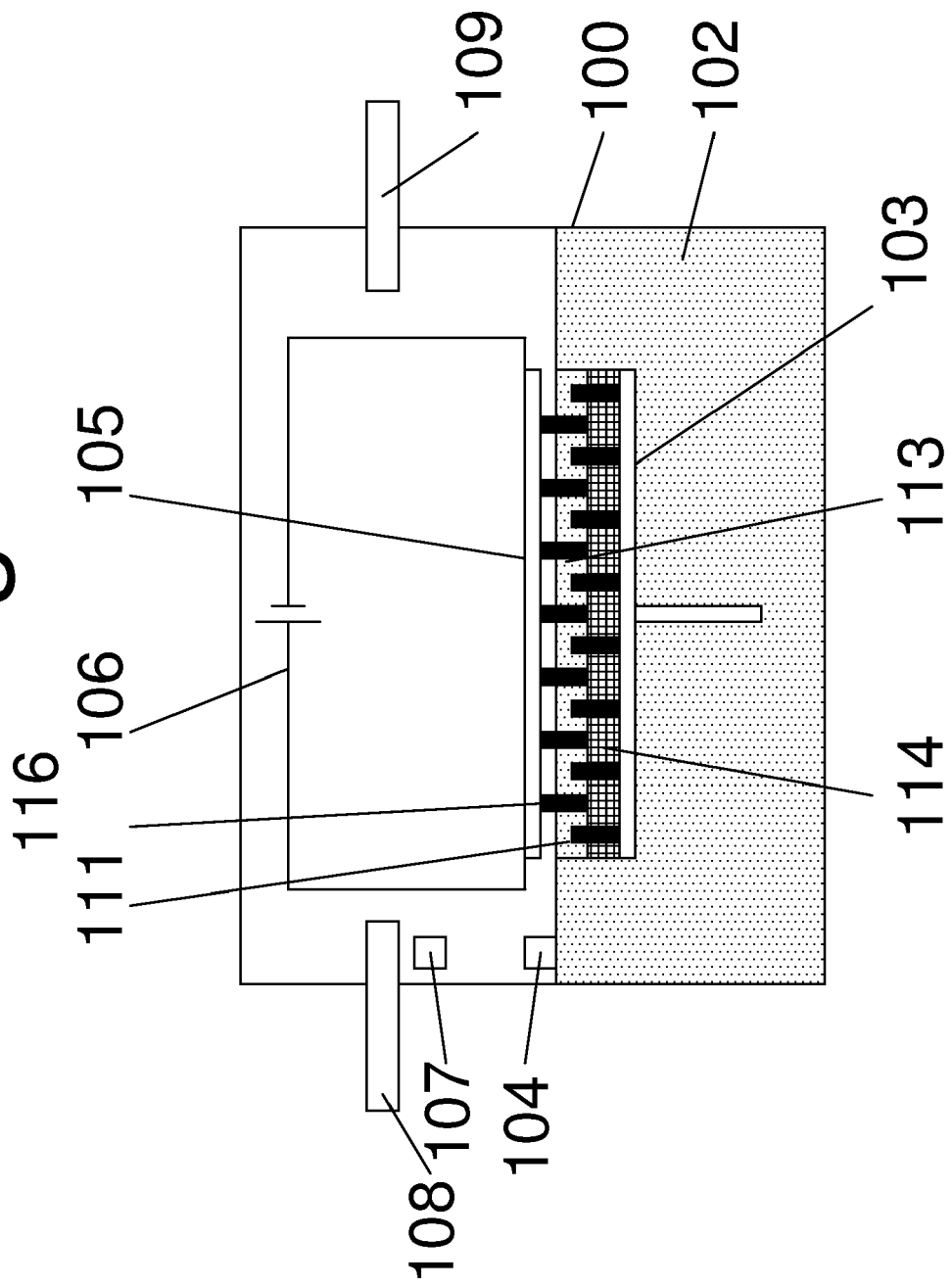

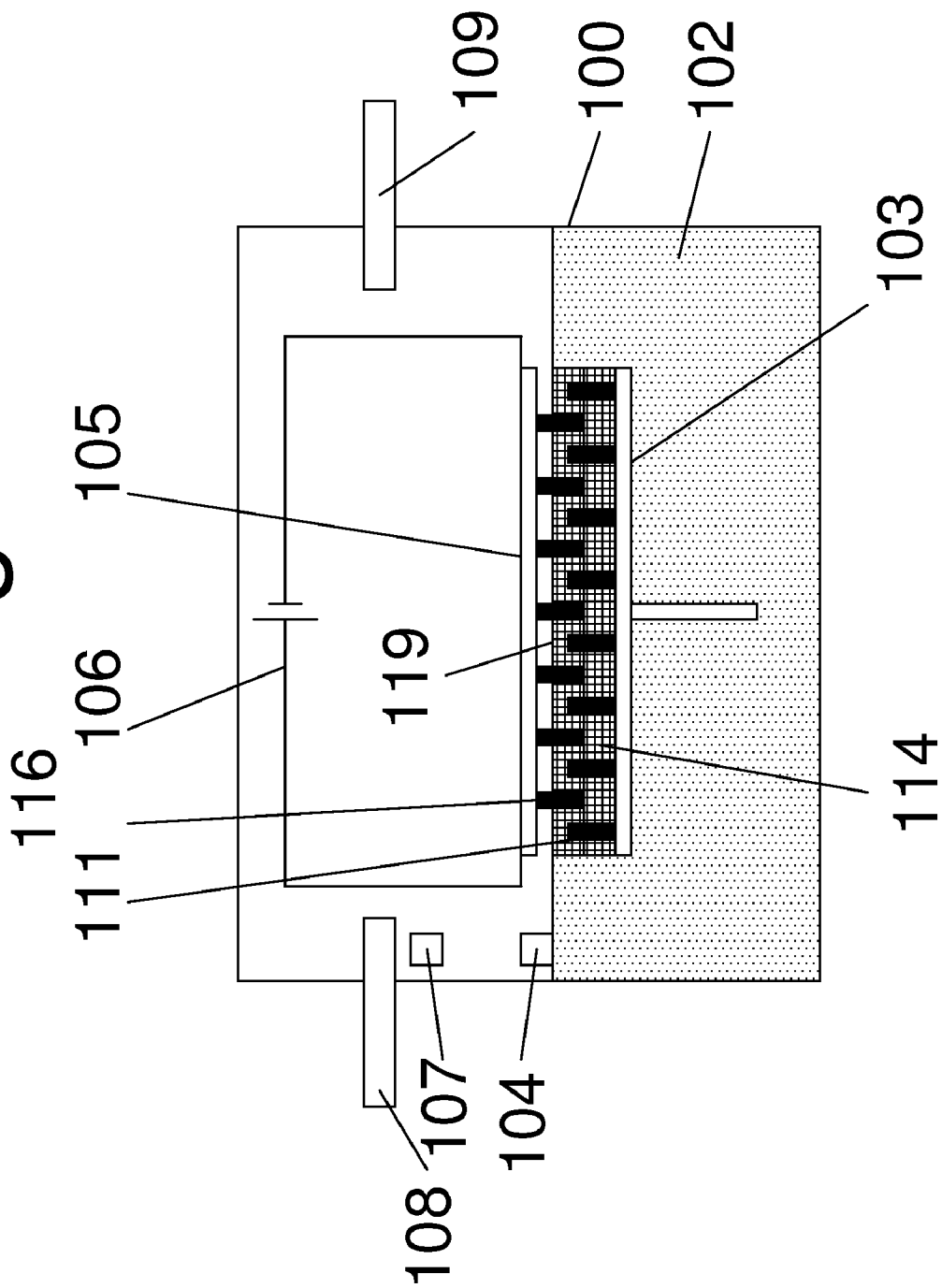

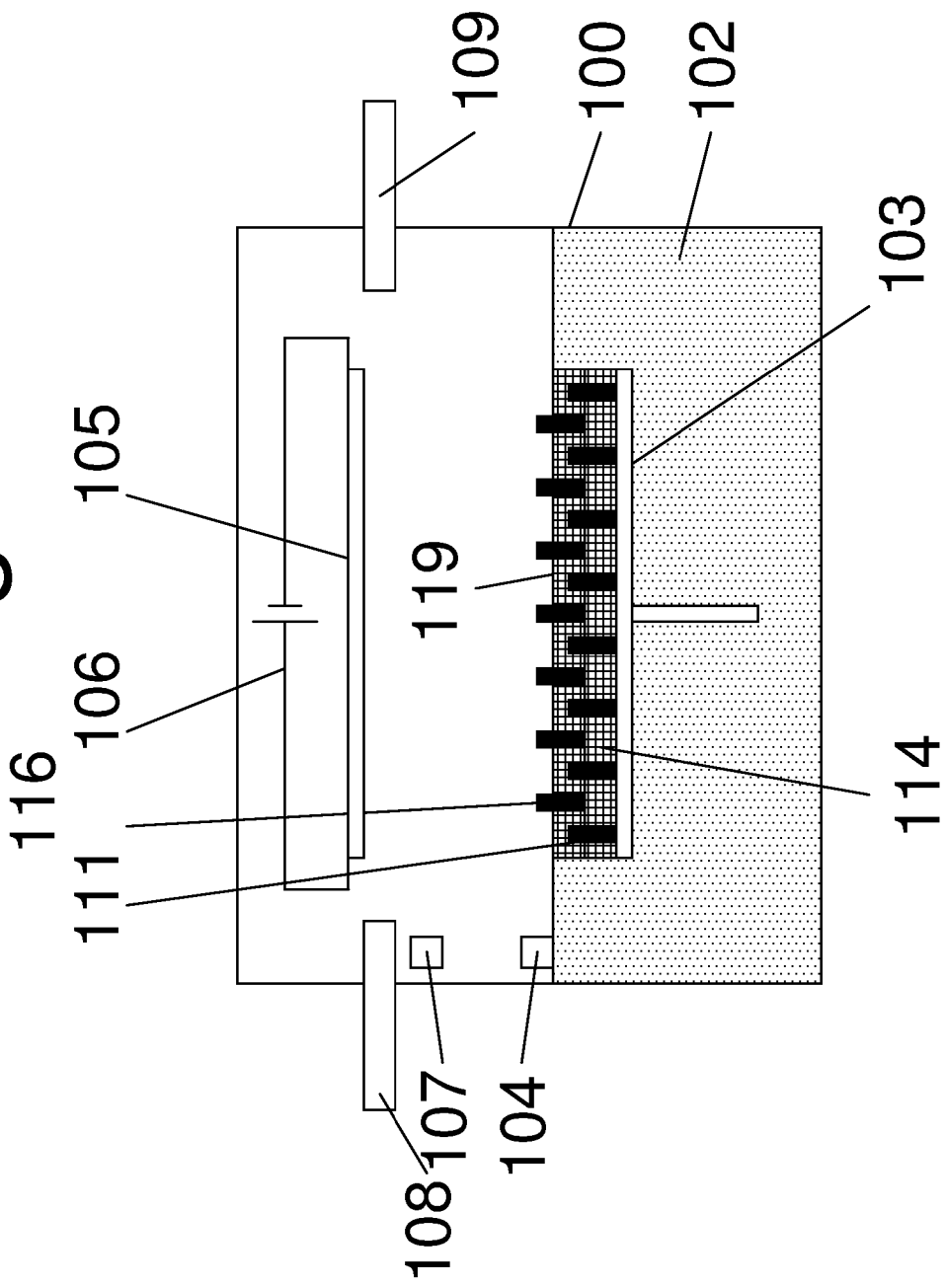

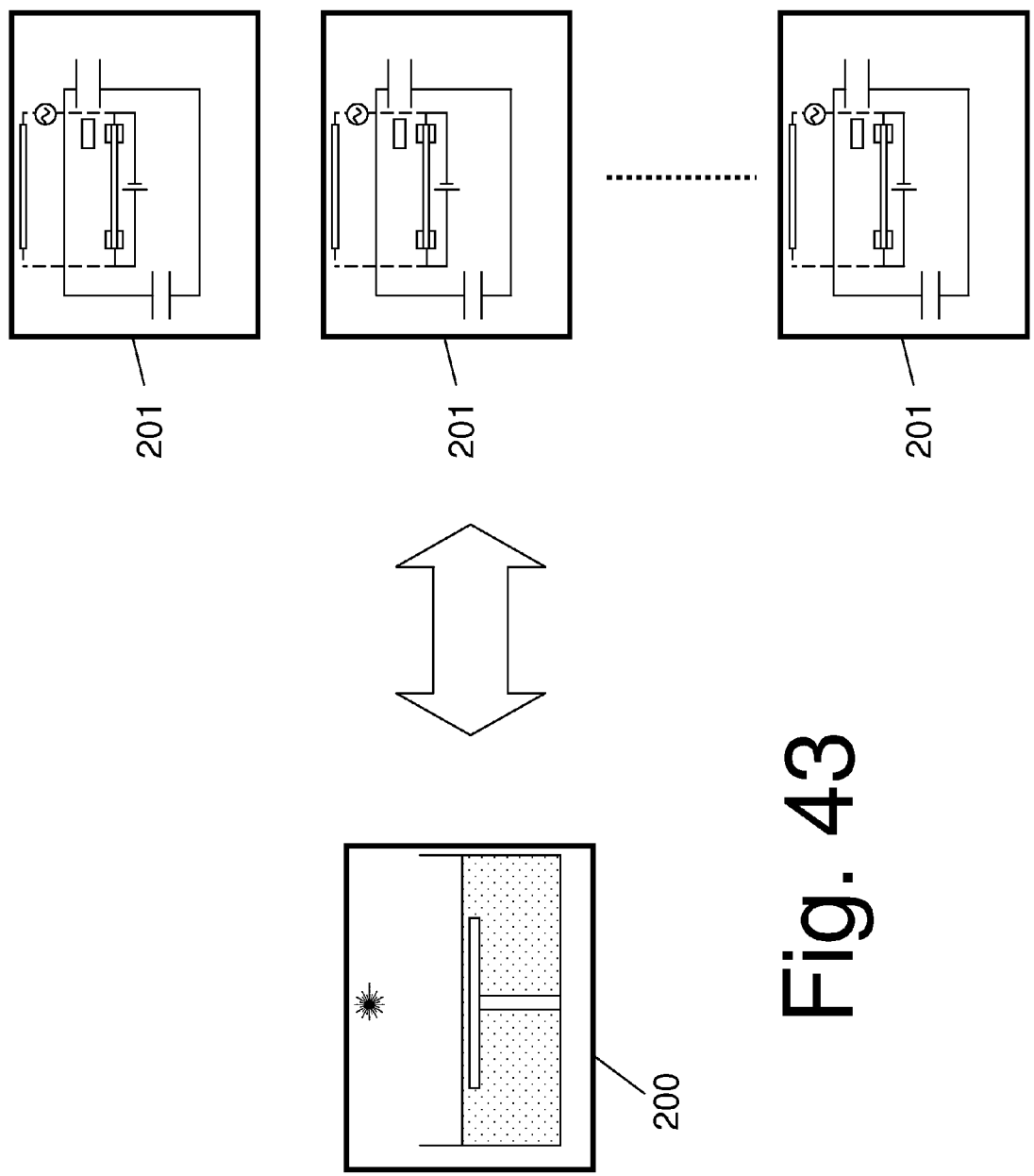

METHOD AND APPARATUS FOR MANUFACTURING A COMPOSITE MATERIAL

This application is the U.S. national phase of International Application No. PCT/GB2008/050655 filed 4 Aug. 2008, which designated the U.S. and claims priority to GB Application No. 0715164.0 filed 6 Aug. 2007, the entire contents of each of which are hereby incorporated by reference.

FIELD OF THE INVENTION

The present invention relates to a method and apparatus for manufacturing a composite material.

BACKGROUND OF THE INVENTION

"Nanostitching" of fibre composites using aligned carbon nanotubes (CNTs) is described in *Chemical, Mechanical, and Thermal Control of Substrate-Bound Carbon Nanotube Growth*, Extended Abstract of Doctoral Thesis, Anastasios John Hart, December 2006. This document is available online at:

pergatory.mitedu/ajhart/research/documents/ ajhart_phdthesisextendedabstract_jan07.pdf Consecutive layers in fibre composites are connected by aligned CNTs which are primarily perpendicular to the fibre surface.

Although such techniques connect consecutive layers of the composite, they fail to provide a continuous link from one side of the composite to the other because the layers of CNTs do not overlap with each other. Also, such techniques do not address the fundamental challenges of producing nano-only composite structures; namely full dispersion with alignment and optimised bonding. Significant challenges remain in this area as mentioned in "Two defining moments: A personal view by Prof. Alan H. Windle", Alan H Windle, Composites Science and Technology 67 (2007) 929-930: "... we need to make materials containing a high volume fraction of nanotubes which are both straight and very well aligned. It will mean an approach radically different to simply stirring (or sonicating) CNTs into a polymer melt or resin, as if they were the ultimate magic filler".

IOP PUBLISHING NANOTECHNOLOGY, Nanotechnology 18 (2007) 165602 (11pp) doi:10.1088/0957-4484/18/16/165602, *Fabrication of composite microstructures by capillarity-driven wetting of aligned carbon nanotubes with polymers*, E J Garcia, A J Hart, B L Wardle and A H Slocum, Published 23 Mar. 2007, describes the interaction, or wetting, of long aligned CNT forests with thermoset polymers. A submersion method is described in which a silicon wafer with CNT pillars is first placed on a stage that allows displacement along the z-axis. A small pool containing polymer is placed below the stage. The stage is lowered until the top surface of the CNT features comes into contact with the polymer pool. At that moment, the suction forces created by the capillary effect draw the polymer into contact with the entire wafer, submerging the CNT pillar completely. The stage is then separated from the pool.

SUMMARY OF THE INVENTION

A first aspect of the invention provides a method of manufacturing a composite material, the method comprising: providing a first layer of reinforcement elements with liquid matrix material in interstitial gaps between the reinforcement elements; dipping a second layer of reinforcement elements into the liquid matrix material in the interstitial gaps such that the reinforcement elements in the second layer become partially embedded in the first layer of reinforcement elements and partially protrude from the first layer of reinforcement elements; impregnating the protruding parts of the reinforcement elements in the second layer with liquid matrix material; and curing the liquid matrix material.

The invention provides a degree of overlap between the adjacent layers of reinforcement, enabling the reinforcement elements to form a continuous link from one side of the composite to the other, if required.

Also, the invention enables the second layer of reinforcement elements (and optionally also the first layer) to be manufactured ex-situ, that is remotely from the liquid matrix material. This allows the reinforcement elements to be manufactured at high temperatures, up to ~1400° C., which is significantly higher than the temperatures required to cure certain types of liquid matrix material such as liquid epoxy resin.

The material may have only two layers, but more preferably the method further comprises adding one or more additional layers of reinforcement elements, each layer being added by dipping the additional layer into liquid matrix material in interstitial gaps of a preceding layer such that the reinforcement elements in the additional layer become partially embedded in the preceding layer of reinforcement elements and partially protrude from the preceding layer of reinforcement elements, impregnating the protruding parts of the reinforcement elements in the additional layer with liquid matrix material; and curing the liquid matrix material.

In the embodiments described below the liquid matrix material in the interstitial gaps is cured before the protruding parts of the reinforcement elements in the second layer are impregnated with liquid matrix material. This enables the liquid matrix material to be cured as a series of layers, each layer being cured at a different time. The benefit of such a layer-by-layer curing approach is that each cured layer may have a different cross-sectional shape, size, or pattern, enabling a "net shape" part to be grown by additive fabrication. However, the invention also extends to cover processes in which all of the liquid matrix material in the composite is cured at the same time. That is, each successive layer of liquid matrix material remains uncured until the part is complete, and the part is then heated to cure the matrix throughout in a single curing step.

As well as varying the shape, size, or pattern of individual matrix layers, at least two of the layers of reinforcement elements may be different (for instance with a different shape, size, density or pattern, or a different alignment direction for the reinforcement elements). This enables the reinforcement layers to be built up as a "net shape", as well as enabling the reinforcement properties of the material to be varied between layers.

Typically the method further comprises suspending the second layer of reinforcement elements from a transfer body as they are dipped into the liquid matrix material; and detaching the transfer body from the second layer of reinforcement elements after they have been dipped into the liquid matrix material. The transfer body may be detached from the second layer of reinforcement elements before or after the liquid matrix material in the interstitial gaps has been cured. In the latter case the liquid matrix material in the interstitial gaps may be cured by locally heating the transfer body.

The second layer of reinforcement elements may be grown on a substrate and then moved to the transfer body. However more preferably the second layer of reinforcement elements is grown on the transfer body.

The liquid matrix material may cured by exposure to electromagnetic radiation, such as a scanning laser beam or other radiation beam. This enables the matrix to be cured selectively—that is with a desired shape, size or pattern.

The reinforcement elements typically have an elongate structure such as tubes, fibres or plates. The reinforcement elements may be solid or tubular. For instance the reinforcement elements may comprise single walled CNTs; multi-walled CNTs, carbon nanofibres; or CNTs coated with a layer of amorphous carbon. In this case the interstitial gaps may be lie between individual CNTs or nanofibres, or between bunches of such CNTs or nanofibres.

Typically at least one of the reinforcement layers comprises reinforcement elements having an aspect ratio greater than 100, preferably greater than 1000, and most preferably greater than $10^6$.

Typically the embedded parts of the reinforcement elements in the second layer have an aspect ratio greater than 100, preferably greater than 1000. Typically the ratio between the length of the embedded parts and the length of the protruding parts is less than 1%, although the ratio may be higher (potentially as high as 50%) if required to increase the density of the material.

Preferably at least one of the reinforcement layers comprises reinforcement elements having a diameter less than 100 nm.

The reinforcement elements may be formed of any material such as silicon carbide or alumina, but preferably the reinforcement elements are formed from carbon. This is preferred due to the strength and stiffness of the carbon-carbon bond.

The reinforcement elements may extend parallel with the plane of their respective layer, but more preferably the reinforcement elements extend in a direction which is not parallel with the plane of their respective layer. Most preferably at least some of the reinforcement elements extend approximately at right angles to the plane of their respective layer.

A second aspect of the invention provides apparatus for manufacturing a composite material, the apparatus comprising:
  a pool of liquid matrix material.
  a build platform in the pool of liquid matrix material;
  a transfer mechanism for transferring a succession of layers of reinforcement elements to the build platform; and
  means for curing liquid matrix material on the build platform.

BRIEF DESCRIPTION OF THE DRAWINGS

Embodiments of the invention will now be described with reference to the accompanying drawings, in which:

FIG. 9 shows the laser being scanned to selectively cure a first layer of resin;
FIG. 10a shows the build platform lowered into the liquid resin;
FIG. 10b is an enlarged view of the build platform after it has been lowered as shown in FIG. 10a;
FIG. 13 shows the opening of the doors between the chambers;
FIG. 14 shows the transport of the transfer body to the ALM chamber;
FIG. 15b is an enlarged view of the build platform after the second layer of CNTs has been transferred as shown in FIG. 15a;
FIG. 16 shows the transfer body being withdrawn upwards;
FIG. 19a shows the build platform lowered into the liquid resin;
FIG. 19b is an enlarged view of the build platform after it has been lowered as shown in FIG. 19a;
FIG. 20 is a schematic view of the composite part after a third layer has been added;
FIG. 21 is a cross-sectional view taken along a line A-A in FIG. 20;
and
FIG. 22 is a cross-sectional view taken along a line A-A in FIG. 20 and showing an alternative distribution of CNTs
FIG. 23 is a schematic diagram showing apparatus for manufacturing an aligned CNT (CNT) bulk polymer composite;
FIGS. 24-42 show various steps in a fabrication process using the apparatus of FIG. 23;
and
FIG. 43 is a schematic view showing an ALM chamber and a stack of CVD-CNT chambers.

DETAILED DESCRIPTION OF EMBODIMENT(S)

Figure 1:
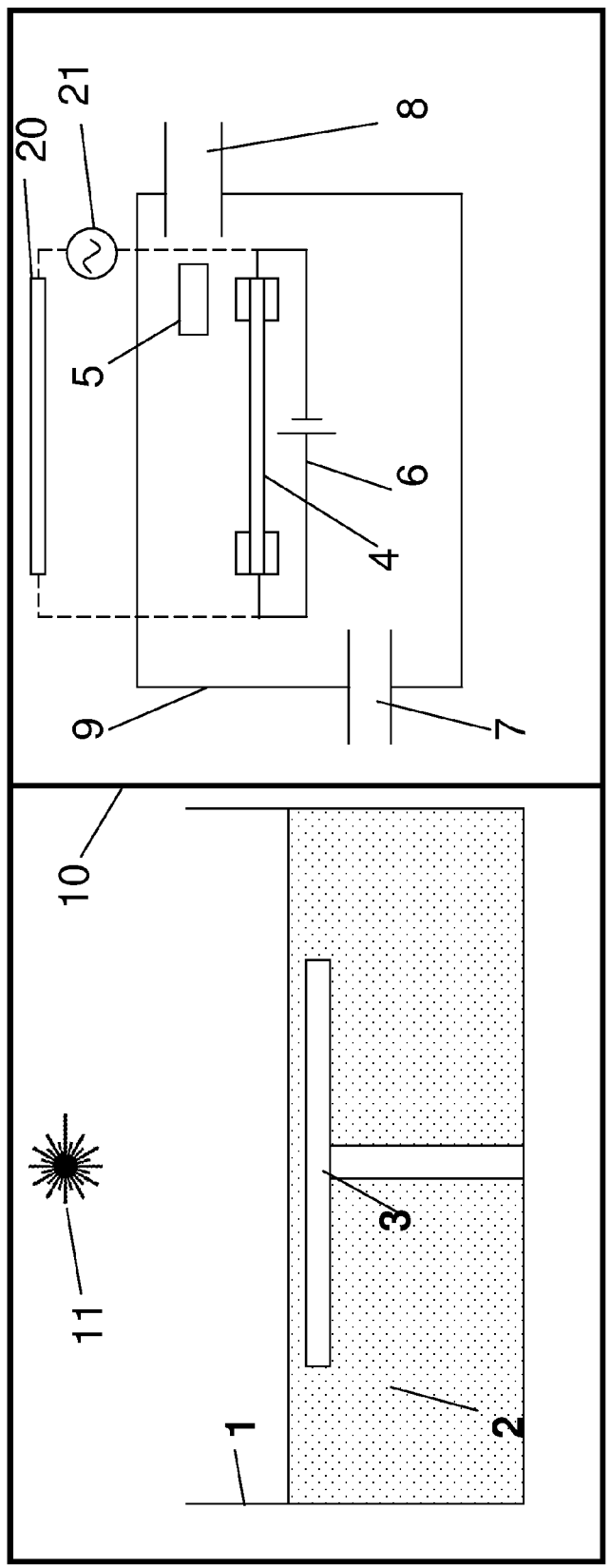
FIG. 1 is a schematic view showing an ALM chamber and a CVD-CNT chamber.

FIG. 1 is a schematic diagram showing an additive layer manufacturing (ALM) chamber on the left hand side of the figure, and a chemical vapour deposition-carbon nanotube (CVD-CNT) growth chamber on the right hand side. These two chambers are separated by a door 10.

The ALM chamber comprises a vat 1 containing an uncured liquid photo curing resin 2. A build platform 3 is mounted in the vat 1 and can be moved up and down as required.

The CVD-CNT chamber contains a silicon transfer body 4 which is connected to an electrical heating circuit 6. The chamber has a gas input 7, a gas output 8 and a door 9.

Figure 2:
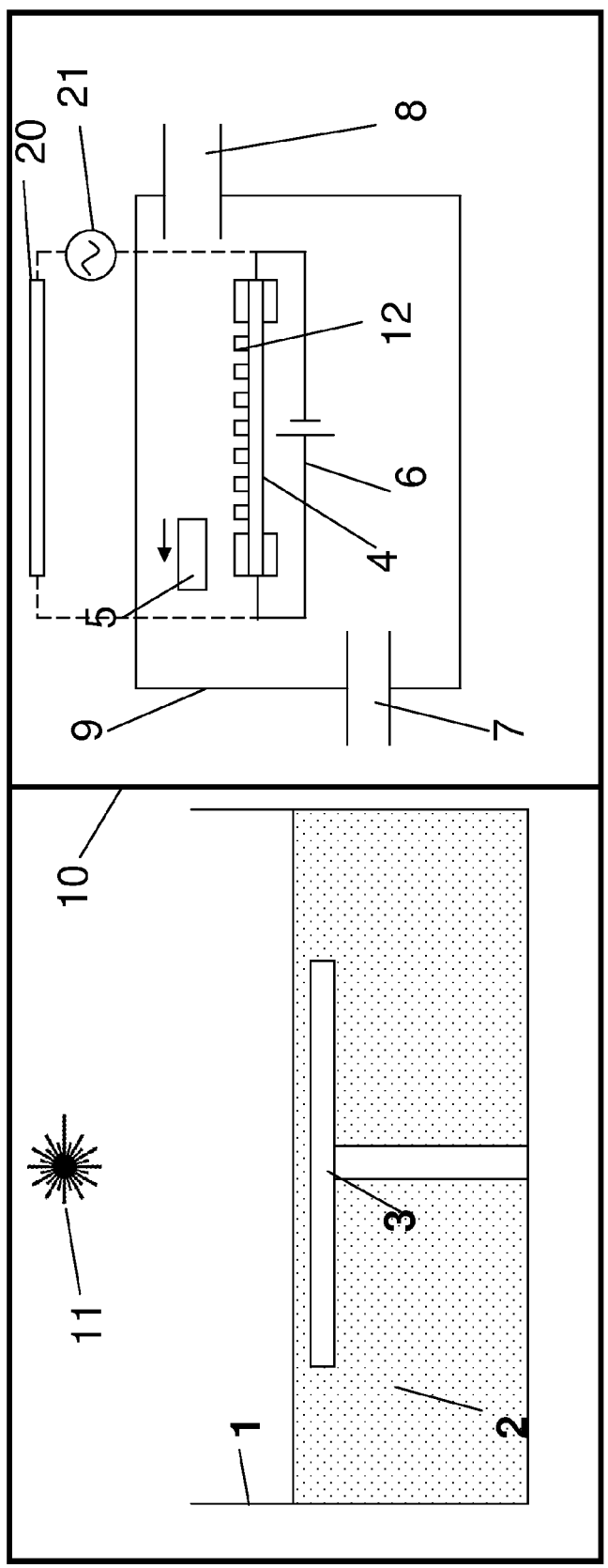
FIG. 2 shows the deposition of a first catalyst layer.

Referring to FIG. 2, a catalyst deposition system 5 deposits catalyst material 12 onto the silicon transfer body 4 in a predefined shape, pattern and density. The system 5 may comprise a printing head which sprays an array of colloid drops onto the transfer body 4, and as the colloid evaporates, metal catalyst particles suspended in the colloid drops are deposited. The catalyst particles may be, for example a metal, preferably transition metals Fe, Ni or Co, or alloys thereof; and the colloid liquid may be, for example alcohol, water, oil, or a mixture thereof. Alternatively the system 5 may deposit catalyst by another process such as evaporation of a metal.

Figure 3:
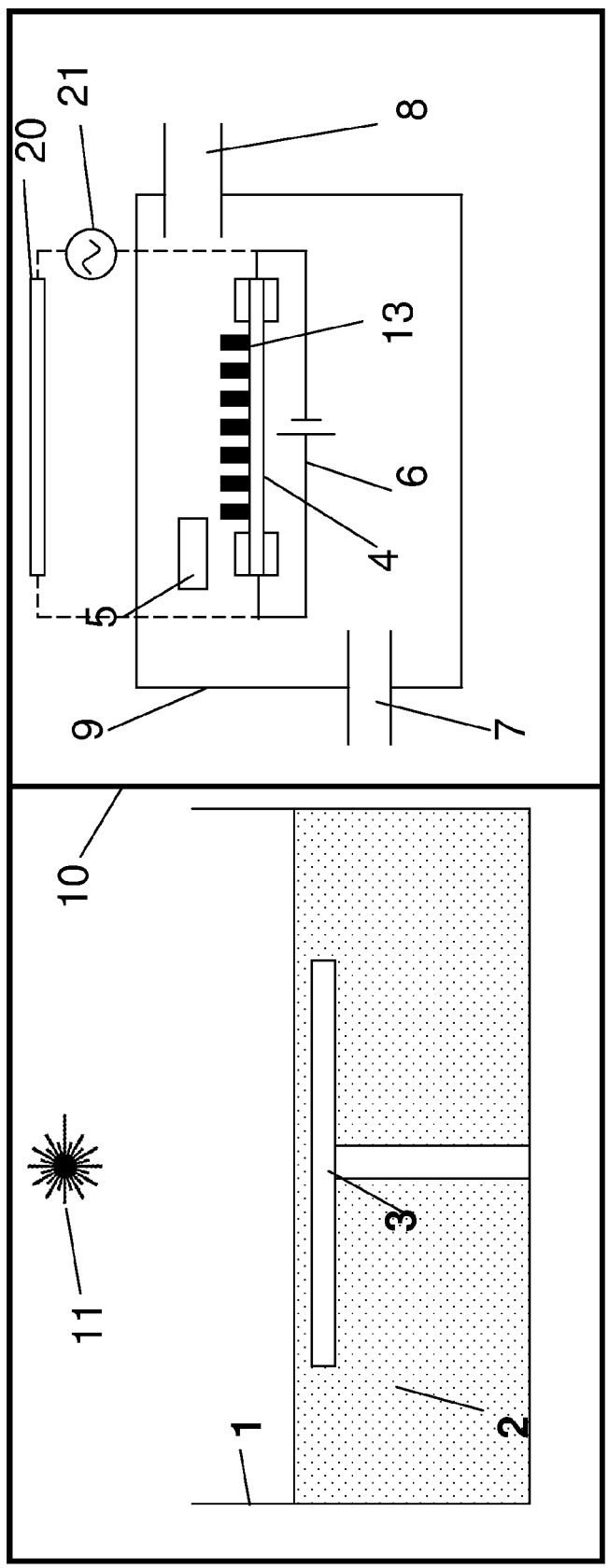
FIG. 3 shows the growth of a first layer of CNTs.

After the catalyst has been deposited, and subsequent conditioning of the catalyst by a combination of heat and oxidation and reduction using oxygen and hydrogen gases, a layer of CNTs 13 is grown by a chemical vapour deposition process as shown in FIG. 3. In particular, carbonaceous gas is introduced into the CVD-CNT chamber via the gas input 7 and the transfer body 4 is heated locally by the electrical heating circuit 6. More specifically, the circuit 6 induces an electrical current in the transfer body 4 which heats it resistively. Growth of nanotubes is enhanced by generating a plasma in the chamber using an electrode 20 powered by a power supply 21.

In the example shown the CNTs 13 are aligned and extend approximately at right angles to the plane of their respective layer. However the position of the electrode 20 may be changed so that the CNTs 13 extend at an angle (typically between 45 degrees and 90 degrees) to the plane of their respective layer.

Figure 4:
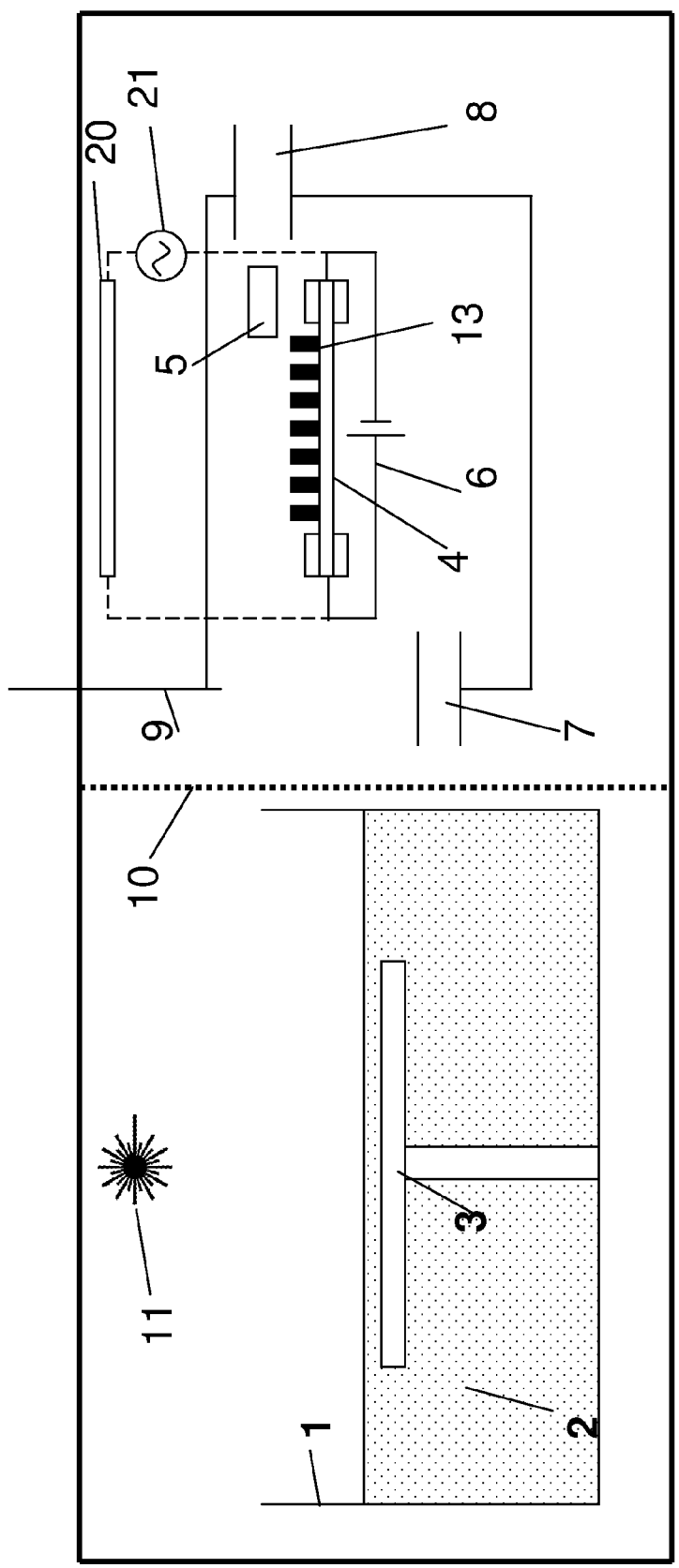
FIG. 4 shows the opening of the doors between the chambers.
Figure 5:
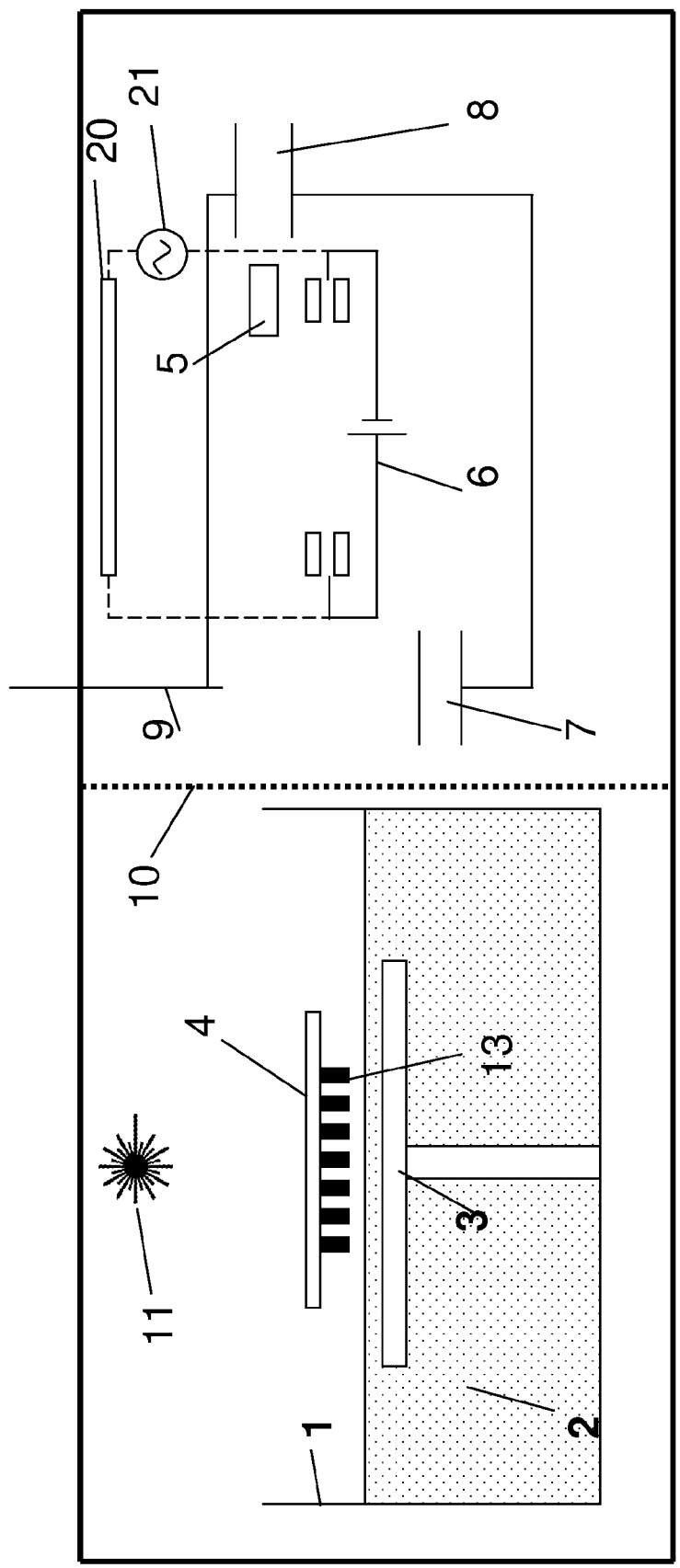
FIG. 5 shows the transport of the transfer body to the ALM chamber.

Referring to FIG. 4, after the first layer of CNTs 13 has been grown, the doors 9,10 between the chambers are opened to allow the transfer body 4 to be decoupled from the resistive heating circuit 6, rotated by 180 degrees, and moved into the ALM chamber as shown in FIG. 5.

Figure 6:
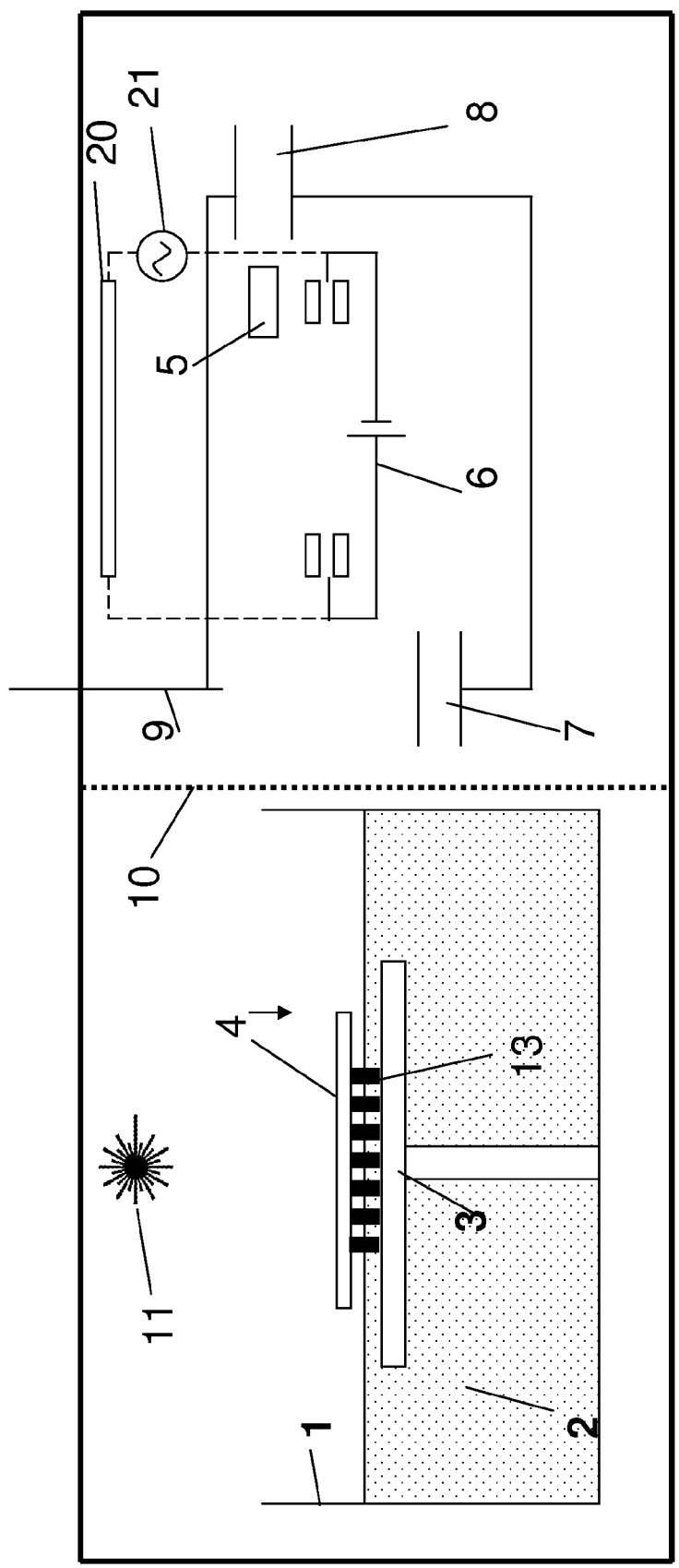
FIG. 6 shows the tips of the CNTs being lowered into the liquid polymer.

Referring to FIG. 6, the transfer body 4 is then lowered such that the tips of the CNTs 13 penetrate into a thin layer of liquid polymer above the build platform 3. A strong surface interaction derives a capillary action effect, wicking the liquid polymer into the interstitial gaps between the CNTs. The first layer of CNTs 13 is penetrated only partially so that the bases of the fibres protrude from the surface of the polymer layer.

Figure 7:
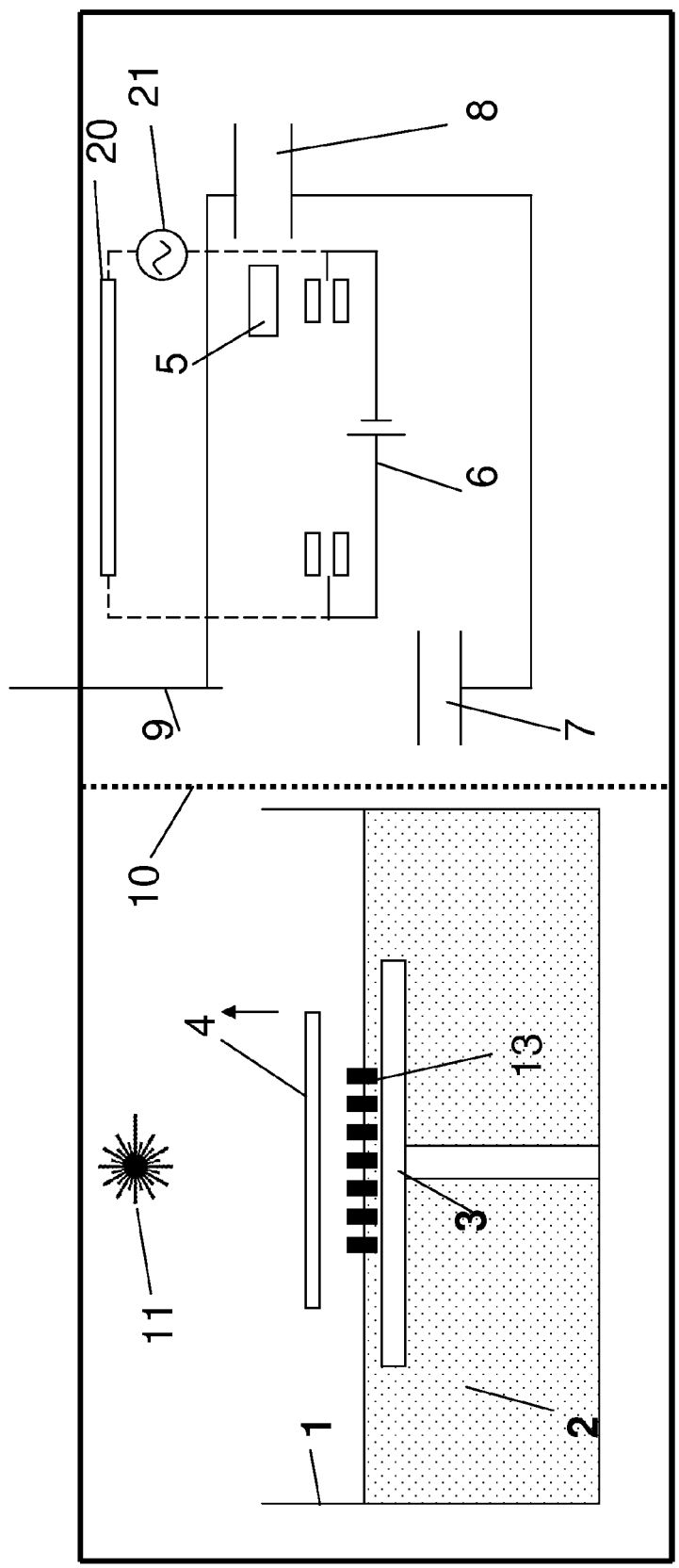
FIG. 7 shows the transfer body being withdrawn upwards.

In the next step shown in FIG. 7, the transfer body 4 is removed. The CNTs 13 remain embedded in the polymer layer due to the surface interactions.

The CNTs 13 may be grown by a "base growth" mechanism as described in *Chemical, Mechanical, and Thermal Control of Substrate-Bound Growth*, Extended Abstract of Doctoral Thesis, Anastasios John Hart, December 2006. In this case the CNTs 13 are attached to the transfer body 4 via the catalyst particles, which remain attached to the transfer body 4 when it is detached from the layer of CNTs 13. This layer of catalyst particles is typically then removed by an acid wash (unless it can be reused to grow the next layer of CNTs).

Alternatively the CNTs 13 may be grown by a "tip growth" mechanism, in which case the catalyst particles will be transferred to the composite material. This may be undesirable (due to the weight of the catalyst particles) or may be desirable if the catalyst particles provide some beneficial property to the composite material.

Figure 8:
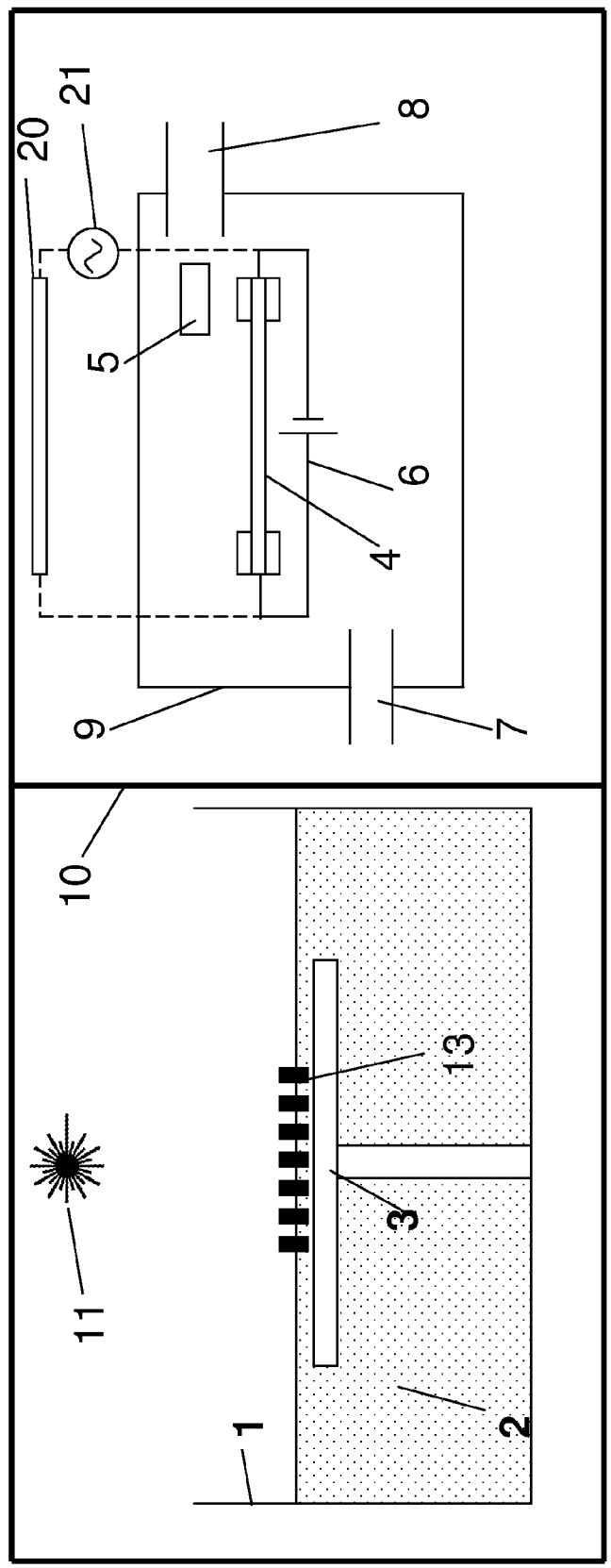
FIG. 8 shows the transfer body returned to the CVD-CNT chamber.

As shown in FIG. 8, the transfer body 4 is then returned to the CVD-CNT chamber and the doors 9, 10 are closed.

Referring to FIGS. 9 and 10a, a laser 11 is activated and scanned over the surface of the layer of CNTs 13 to selectively cure areas of resin, resulting in a base layer comprising a cross-linked and hardened polymer matrix layer 14 surrounding the CNT layer 13. The build platform 3 is then lowered into the bulk of the liquid resin 2 as shown in FIGS. 10a and 10b, allowing a flow of liquid resin over the surface of the base layer, into the interstitial gaps 18 between the CNTs 13 protruding from the matrix layer 14.

Note that the width and length of the CNTs 13 shown in FIG. 10a is not to scale. In practice the diameter of the nanotubes is significantly less than the spacing between adjacent nanotubes. FIG. 10b is somewhat more representative, showing a larger gap between the nanotubes (although it is still not to scale since the aspect ratio of the nanotubes may be as high as $10^7$ or more (10 nm diameter and 100 μm length)).

Figure 11:
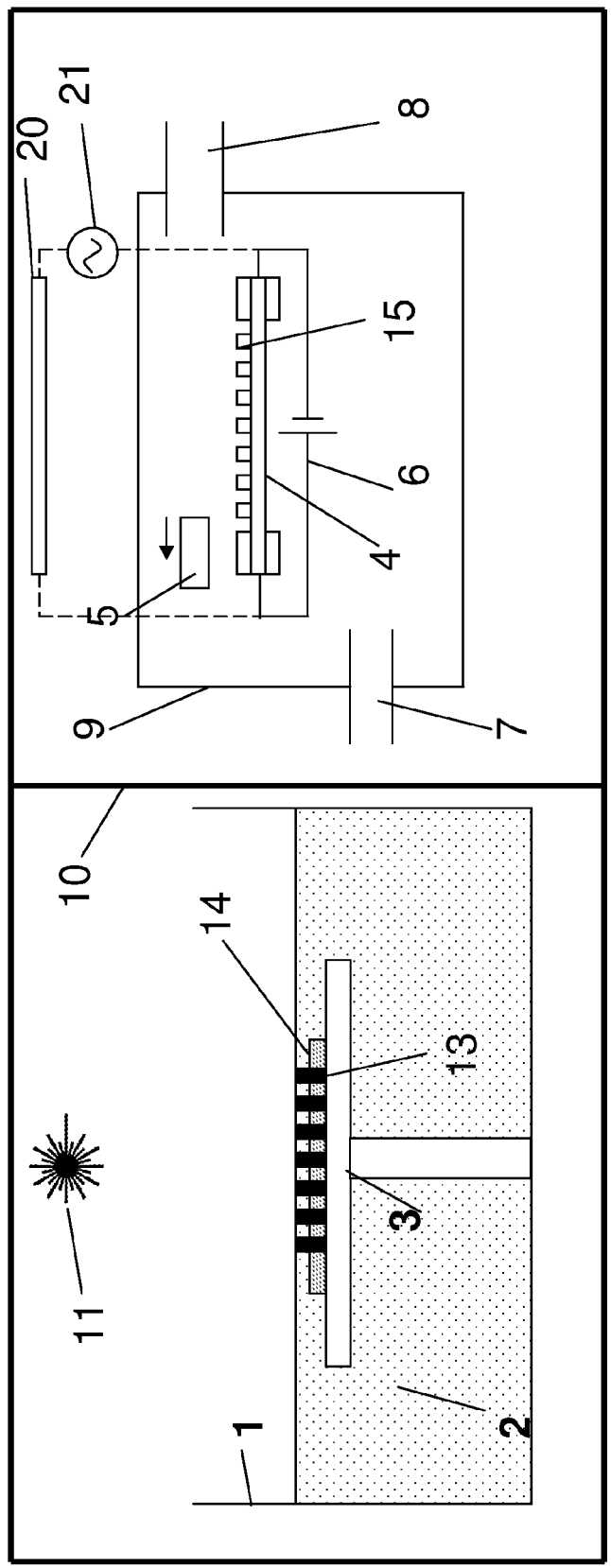
FIG. 11 shows the deposition of a second catalyst layer.
Figure 12:
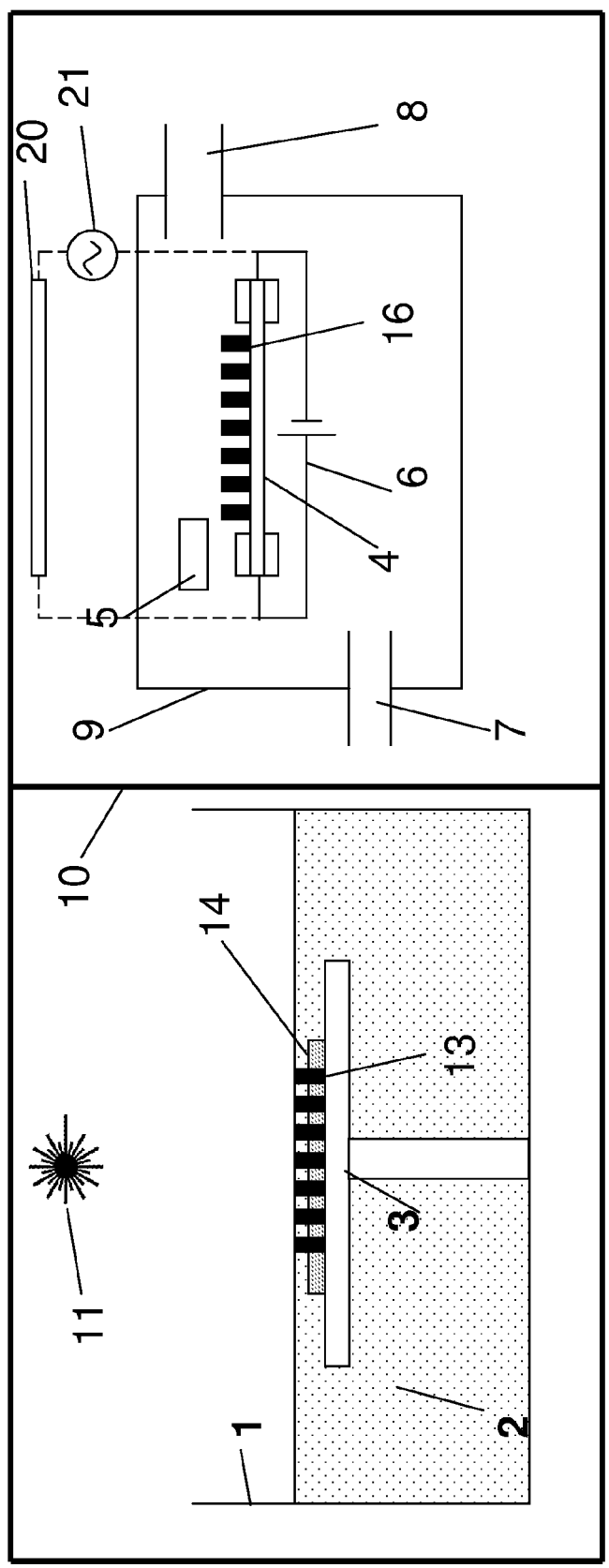
FIG. 12 shows the growth of a second layer of CNTs.

The process then repeats as shown in FIGS. 11-19. A second layer of catalyst is then deposited as shown in FIG. 11 (assuming that an existing catalyst layer is not being reused) and a second layer of CNTs 16 is grown as shown in FIG. 12.

Figure 15A:
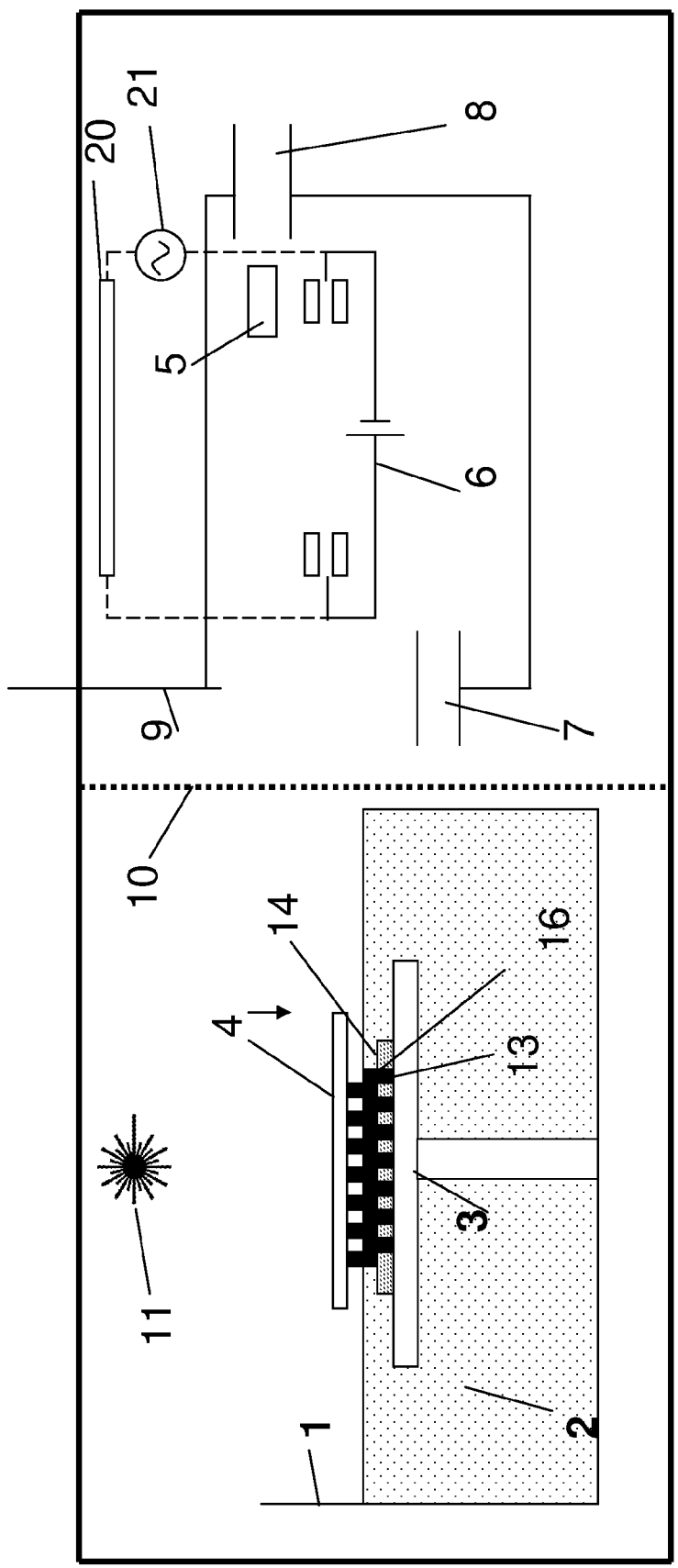
FIG. 15a shows the tips of the CNTs being lowered into the interstitial gaps in the first layer.

The second layer 16 is then transported into the ALM chamber as shown in FIG. 14 and lowered as shown in FIG. 15a so that the tips of the CNTs 16 penetrate into the liquid polymer layer 2. As well as being dipped into the liquid polymer layer 2, the fibres in the second layer 16 become partially embedded in the first layer of CNTs 13 and partially protrude from the first layer of CNTs 13. As shown in FIG. 15b, the tips of the CNTs in the second layer 16 penetrate into the interstitial gaps 18 between the CNTs in the first layer 13 to form a region of overlap. Capillary action also causes the liquid resin to wick upwards above the tips of the CNTs 13 as shown in FIG. 15b. In fact capillary action may cause the liquid to wick further than illustrated in FIG. 15b, potentially as far as the base of the CNTs 16 next to the transfer body 4.

Note that the degree of overlap between the two layers (that is, the ratio between the length of the embedded parts and the length of the protruding parts of the second layer 16) is relatively high in FIG. 15b for purposes of illustration. However, in practice the degree of overlap may be as low as 0.01%.

Figure 17:
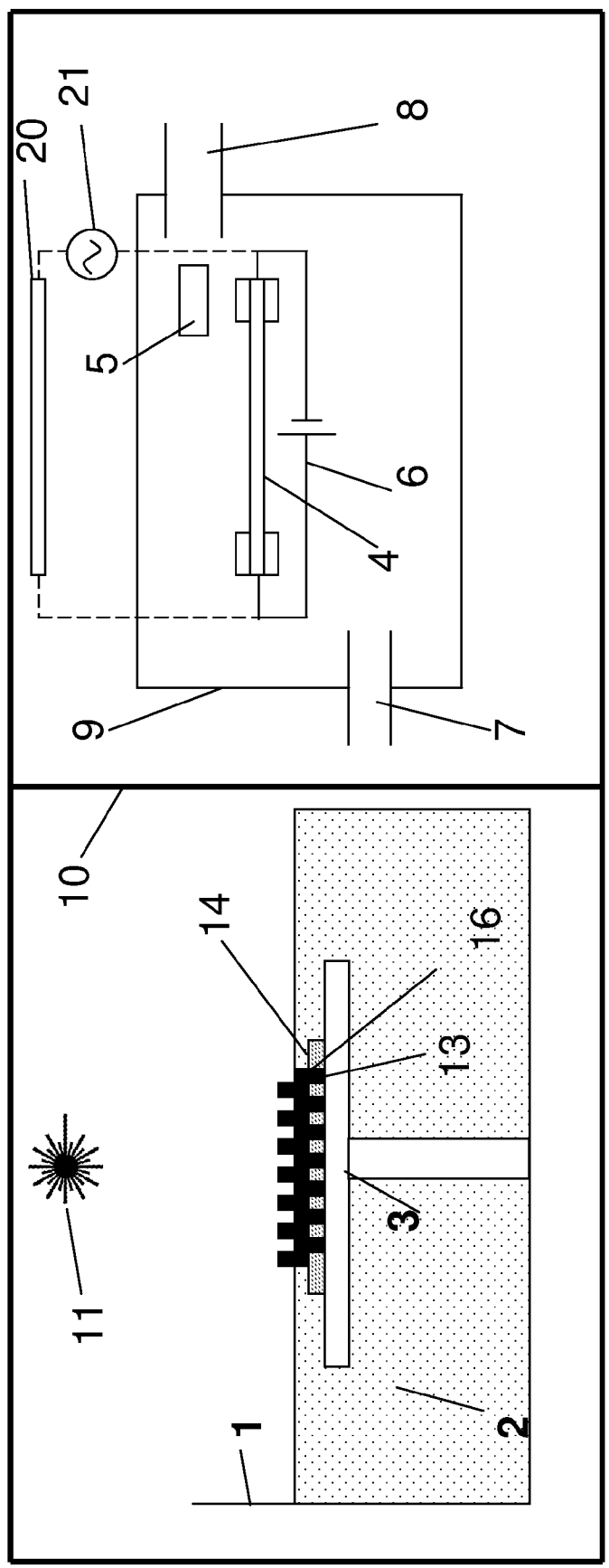
FIG. 17 shows the transfer body returned to the CVD-CNT chamber.
Figure 18:
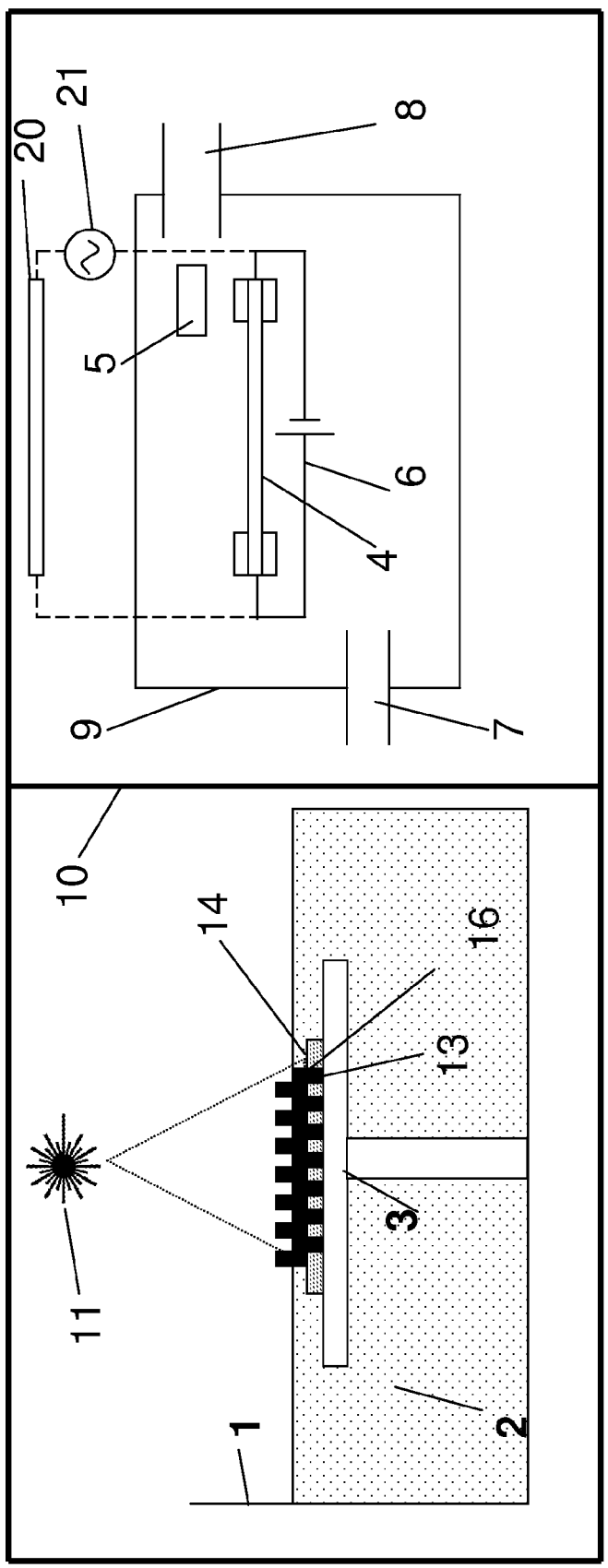
FIG. 18 shows the laser being scanned to selectively cure a second layer of resin.

The transfer body 4 is then removed as shown in FIG. 16 and returned to the CVD-CNT chamber as shown in FIG. 17. The laser 11 is then activated in FIG. 18 to form a second hardened layer 17 shown in FIGS. 19a and 19b. The build platform 3 is then lowered into the vat as shown in FIG. 19a, allowing a flow of liquid resin over the surface of the build platform, into the interstitial gaps between the CNTs 16 protruding from the matrix layer 17.

The process can then be repeated a number of times to produce a composite part. For instance a three-layer part is shown in FIG. 20, including a third layer of CNTs 23 in a matrix layer 22.

The layers of CNTs 13,17,23 are illustrated in FIGS. 3-20 with constant spacing between the adjacent CNTs. However this is only schematic, and in practice there will be a random and irregular spacing between the CNTs as shown in FIG. 21 (which is a schematic cross-section taken along a line A-A shown in FIG. 20).

Note that there is relatively little bunching of CNTs in FIG. 21. In other words there is a high degree of mixing of individual CNTs between the two layers in the region of overlap. In an alternative arrangement the catalyst particles may be grouped together to form bunches of CNTs 13a, 16a as shown in FIG. 22. Thus in the case of FIG. 21 the tips of the bunches 16a in the second layer penetrate interstitial gaps between the bunches 13a in the first layer.

FIG. 23 is a schematic diagram showing apparatus for manufacturing an aligned CNT bulk polymer composite. The boundary of the apparatus, for containing the liquid resin material, referred to as the 'vat' is indicated at 100. This contains a thermally curable liquid resin material 102 (such as Hexcel RTM6 product or similar). A part bed 103 is precisely moveable in the z-axis. A doctor blade 104 for ensuring a flat surface on the liquid resin material, is moveable in the horizontal plane. A resistively heated substrate 105 is precisely movable in the z-axis. A power supply 106 is arranged to resistively heat the substrate 105. Ink-jet apparatus 107 is provided for depositing catalyst material held in solution or suspension. Alternatively apparatus may be provided for evaporating a metal target for deposition onto the resistively heated substrate 105. A gas supply 108 supplies a gas mixture containing a hydrocarbon gas or carbon monoxide, hydrogen gas and an inert gas and combinations there of. A gas exhaust is indicated at 109.

In FIG. 24 the catalyst deposition apparatus 107 moves across the resistively heated substrate 105, depositing a layer of catalyst material 110.

In FIG. 25 the power supply 106 is turned on to heat the substrate 105. This heats, spherulises and activates (by reduction) the catalyst material 110 under a flow of gas. The activated catalyst material is labelled 110'.

Figure 26:
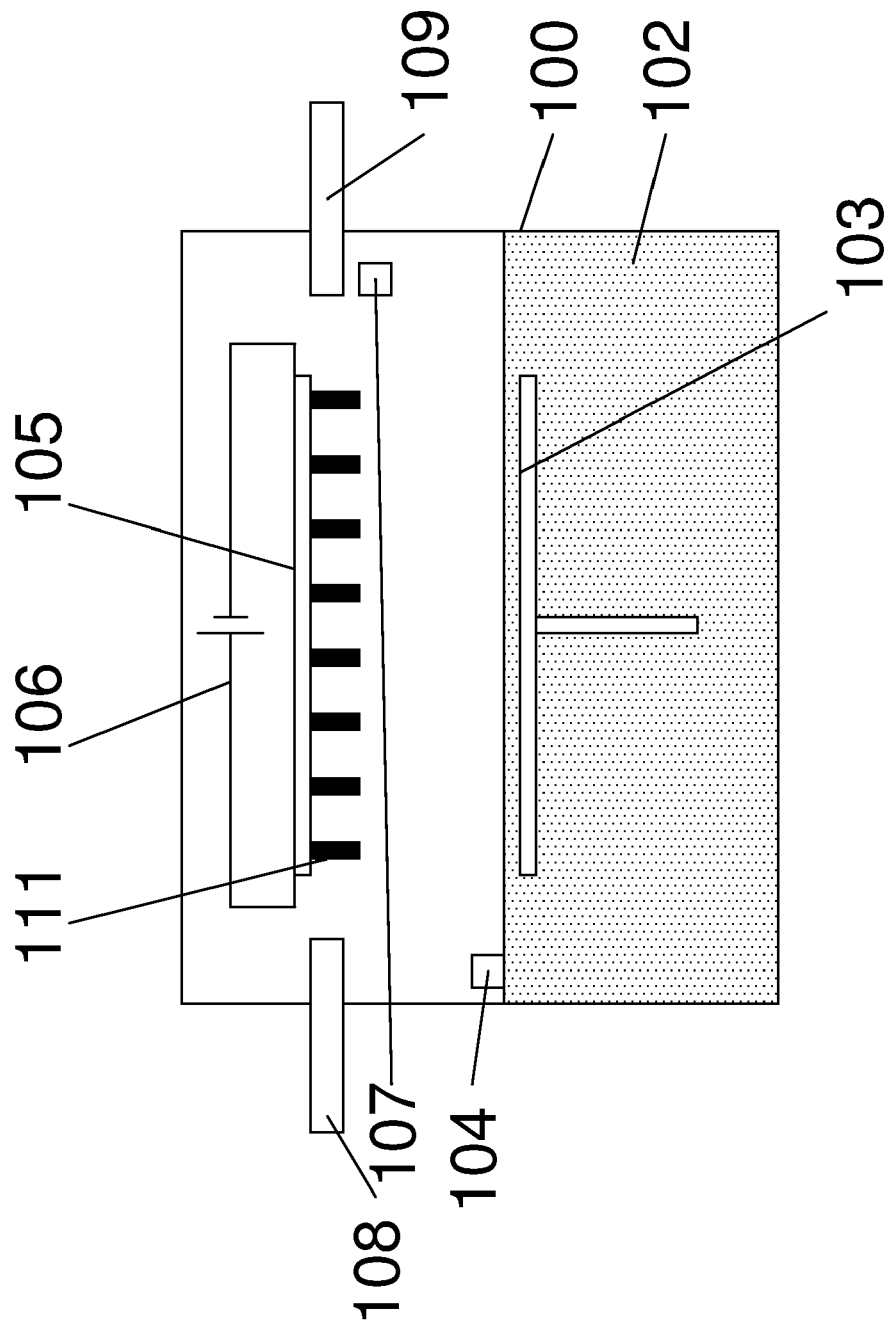

In FIG. 26 the resistively heated substrate 105 continues to be heated by power supply 106. A flow of carbonaceous and carrier gas is introduced from the gas supply 108 causing the nucleation and growth of a CNT array 111 catalysed by the catalysts 110 previously deposited.

Figure 27:
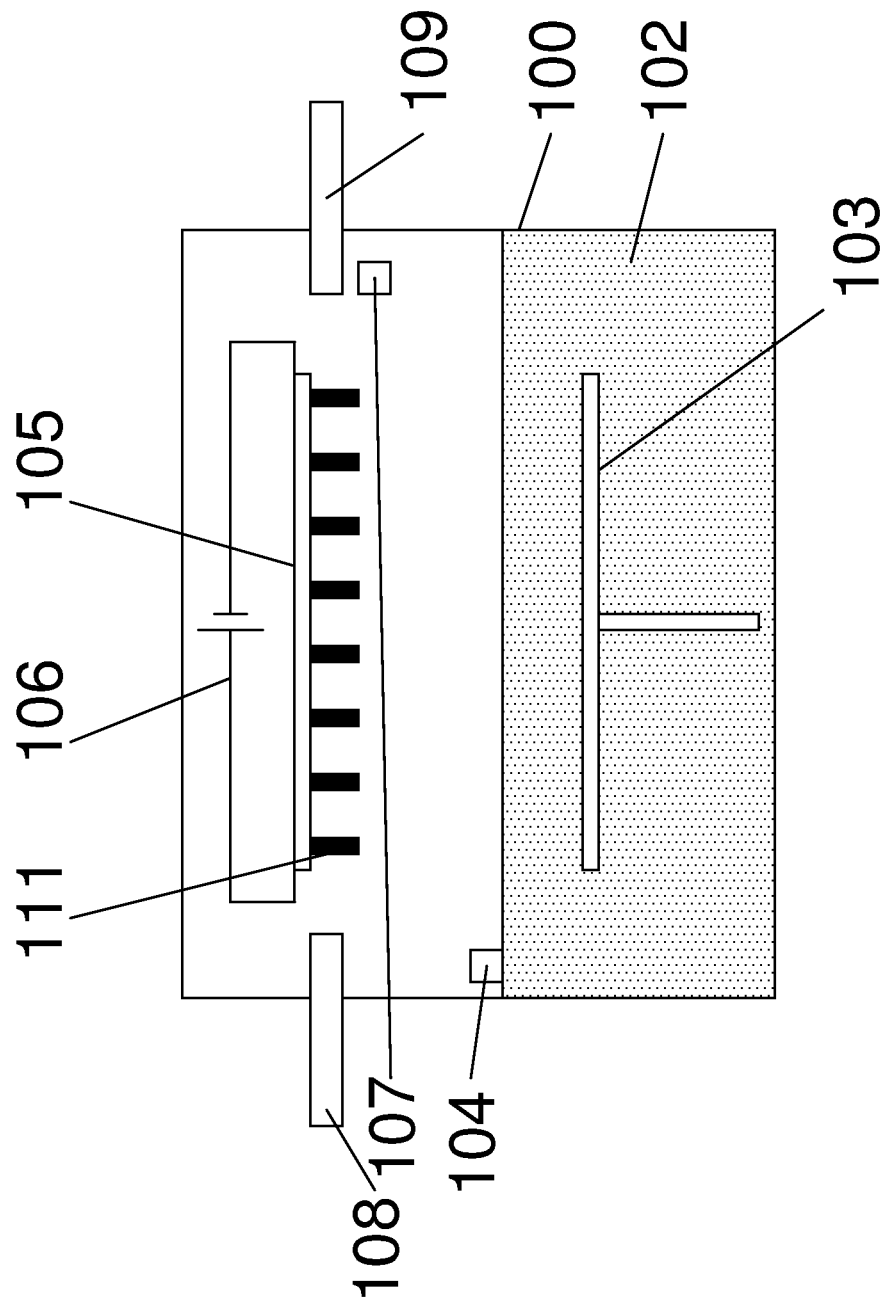

The gas supply 108 and power 106 are then turned off and as shown in FIG. 27 the part bed 103 is moved down into the liquid resin 102.

Figure 28:
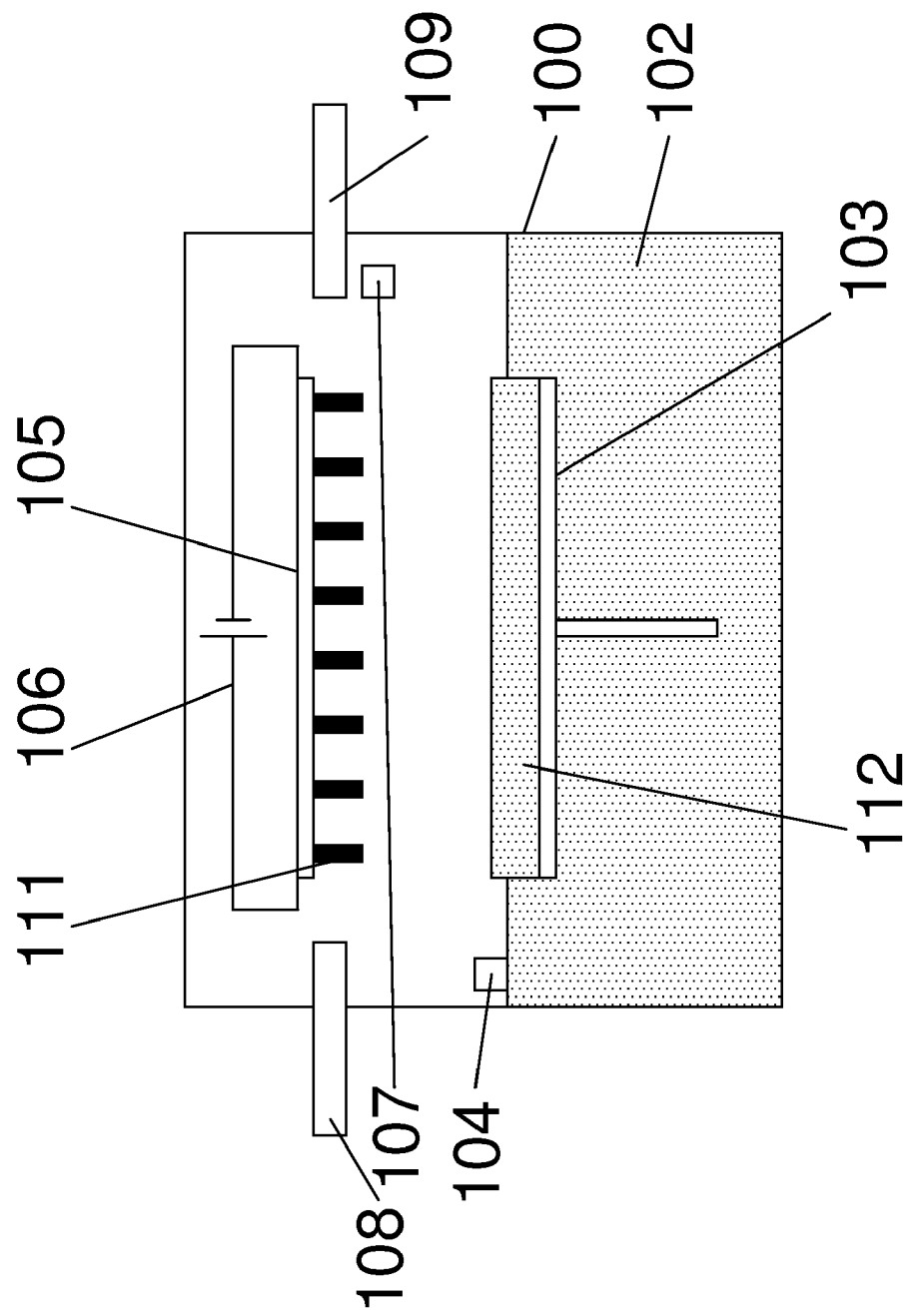

In FIG. 28 the part bed is moved upward, creating a raised pool 112 of resin.

Figure 29:
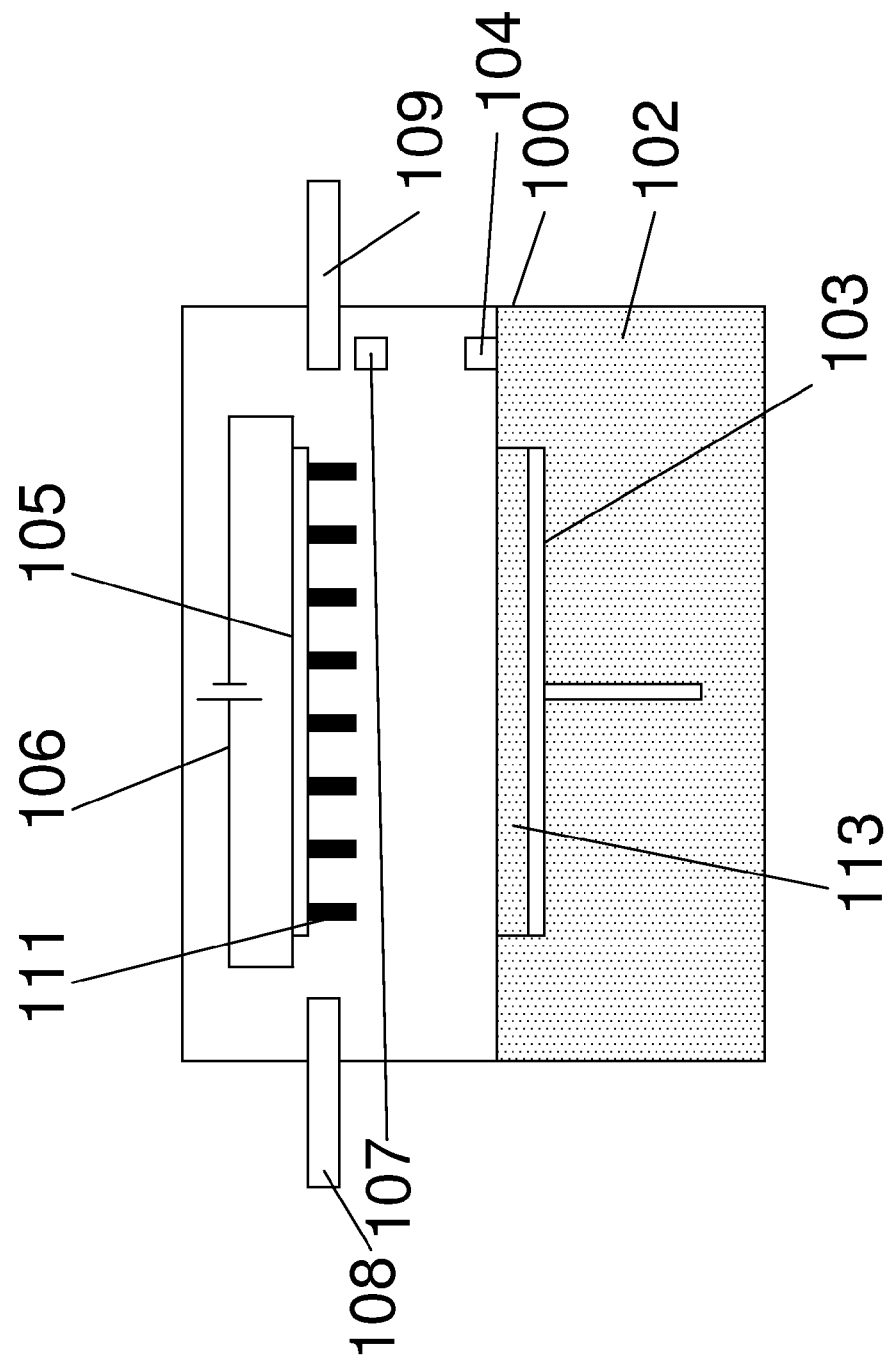

In FIG. 29 the doctor blade 104 moves across the part bed, flattening the previously raised pool 112 of resin to leave a flattened layer 113.

Figure 30:
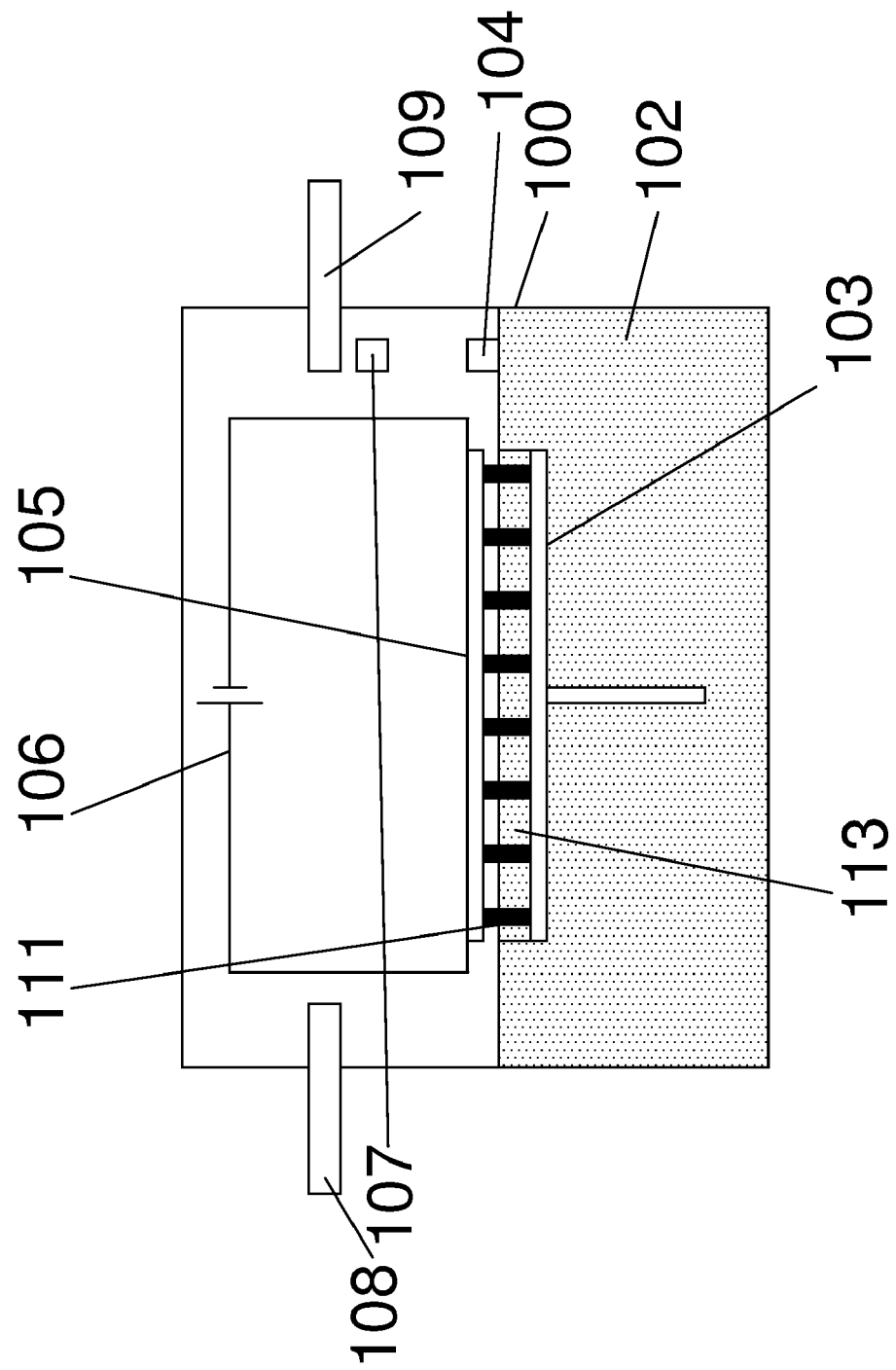

In FIG. 30 the substrate 105 is moved down so that the CNTs 111 are dipped into the liquid resin 113. The movement is precisely controlled so that a proportion of the length of the CNTs 111 is left protruding from the liquid resin surface.

Figure 31:
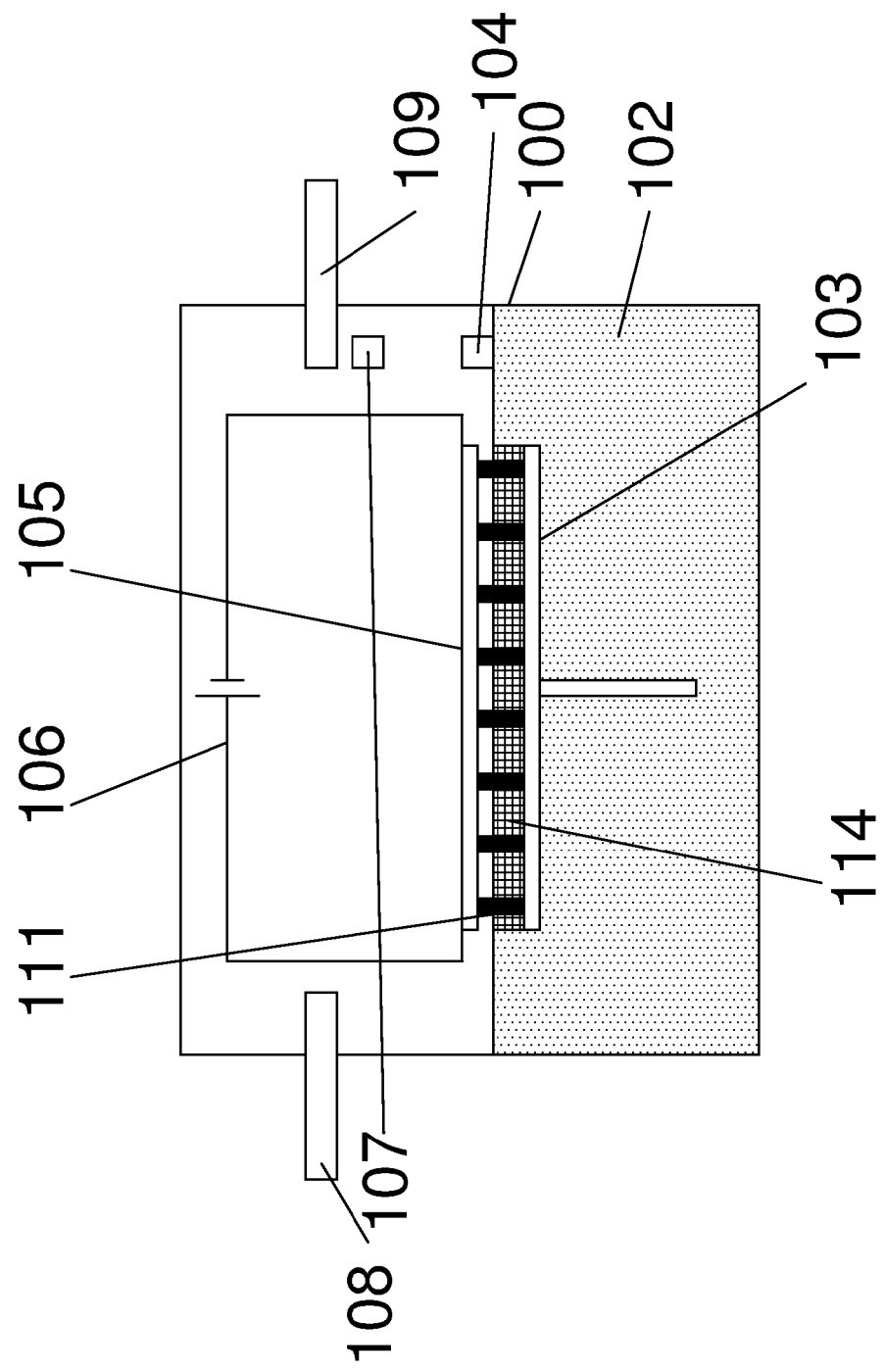

In FIG. 31 the power supply 106 is switched on, heating the substrate 105. Heat is rapidly conducted into the CNT network 111 as the CNTs exhibit very high thermal conductivities. The hot CNTs very efficiently conduct the heat into the liquid resin material, causing a rapid cross-linking of the material and solidification to produce a cured layer 114.

Figure 32:
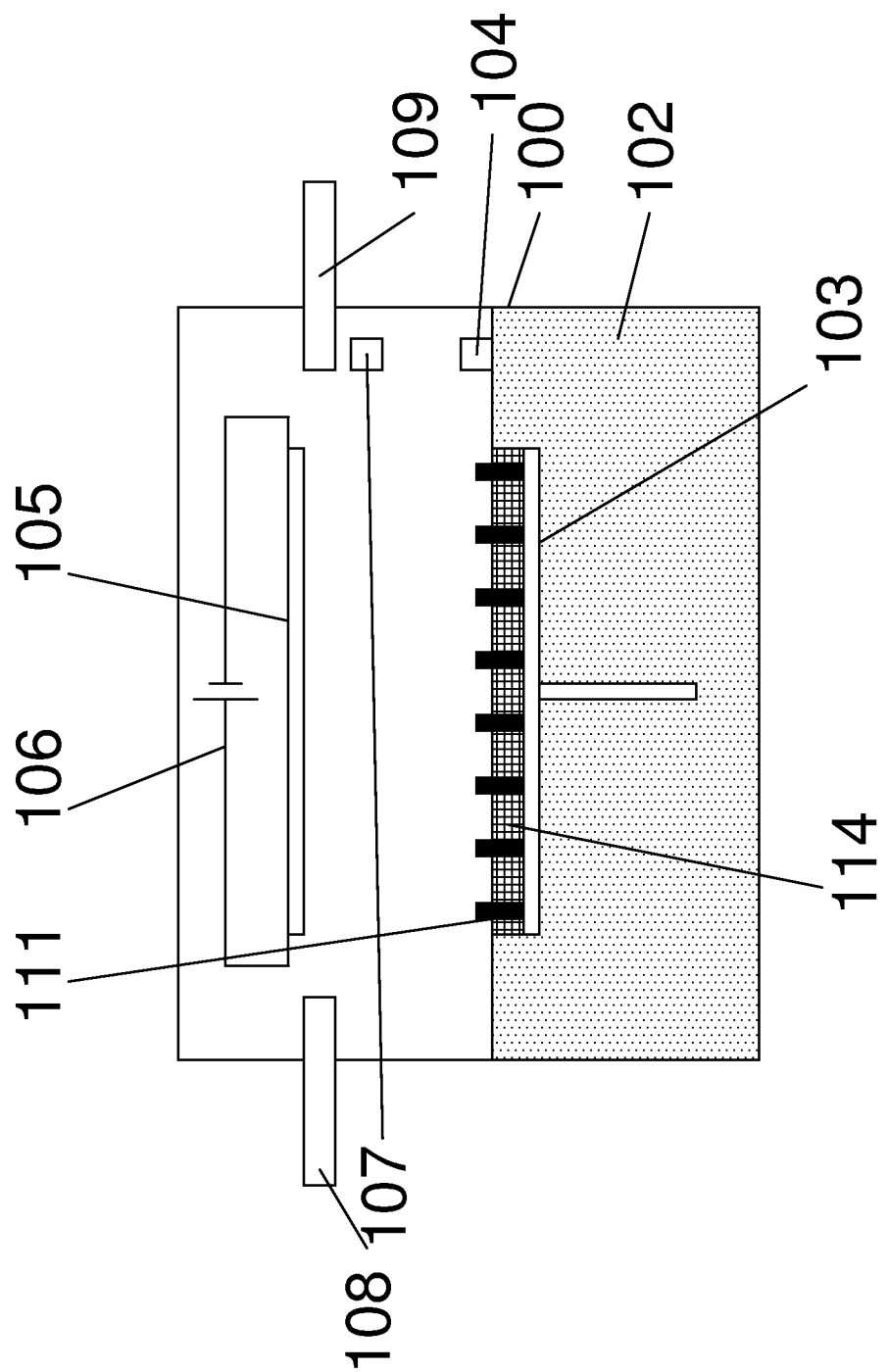
Figure 33:
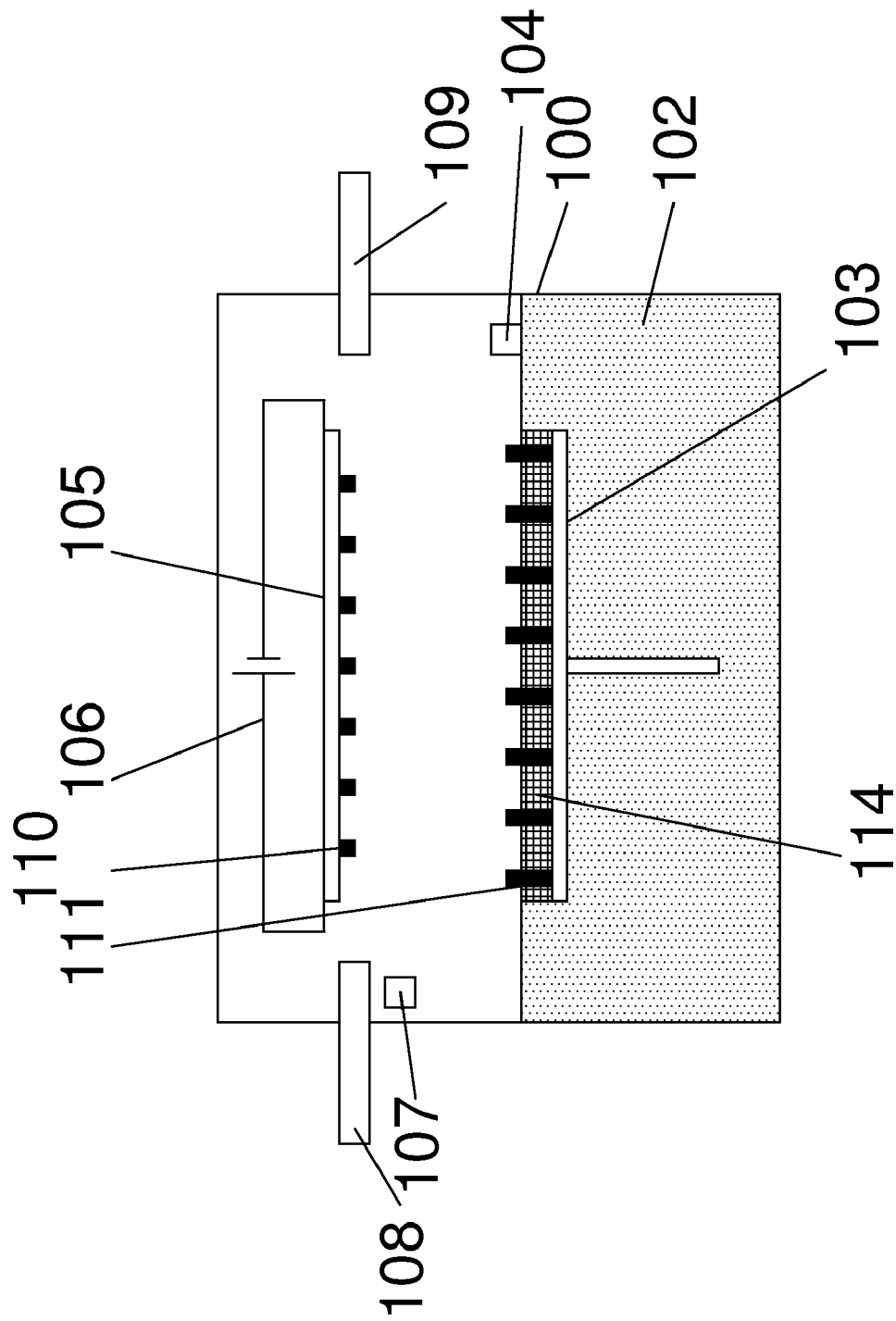
Figure 34:
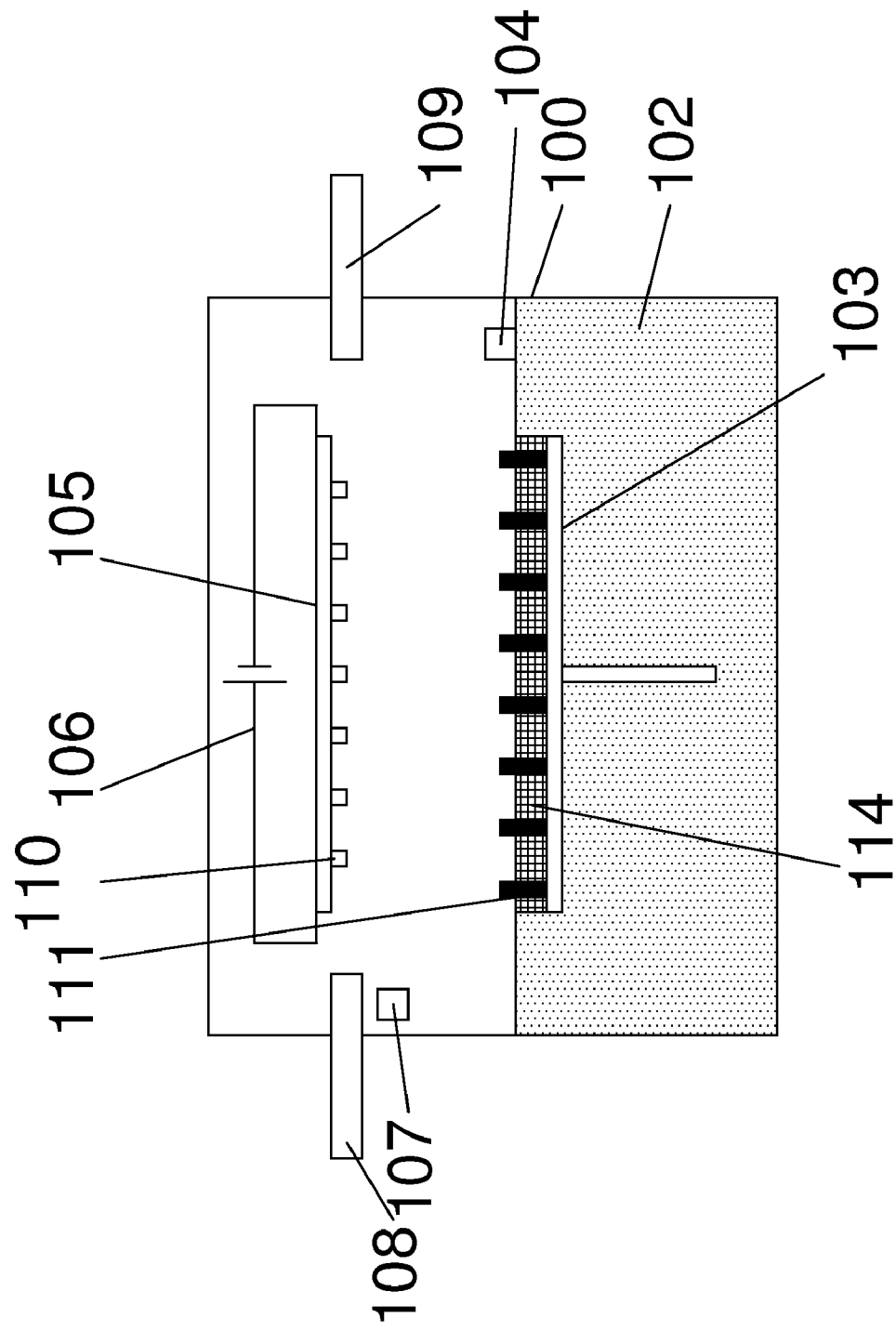
Figure 35:
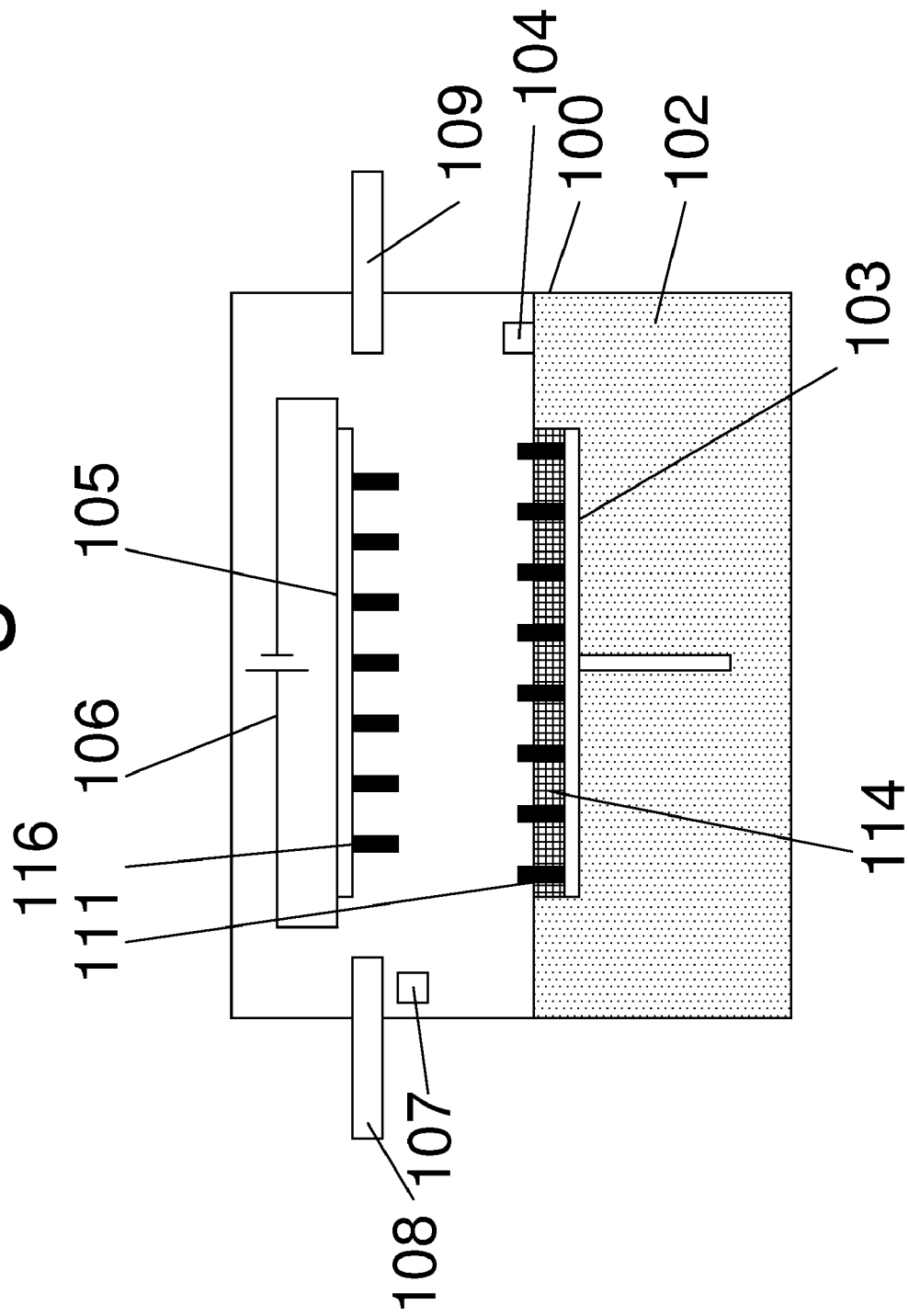
Figure 36:
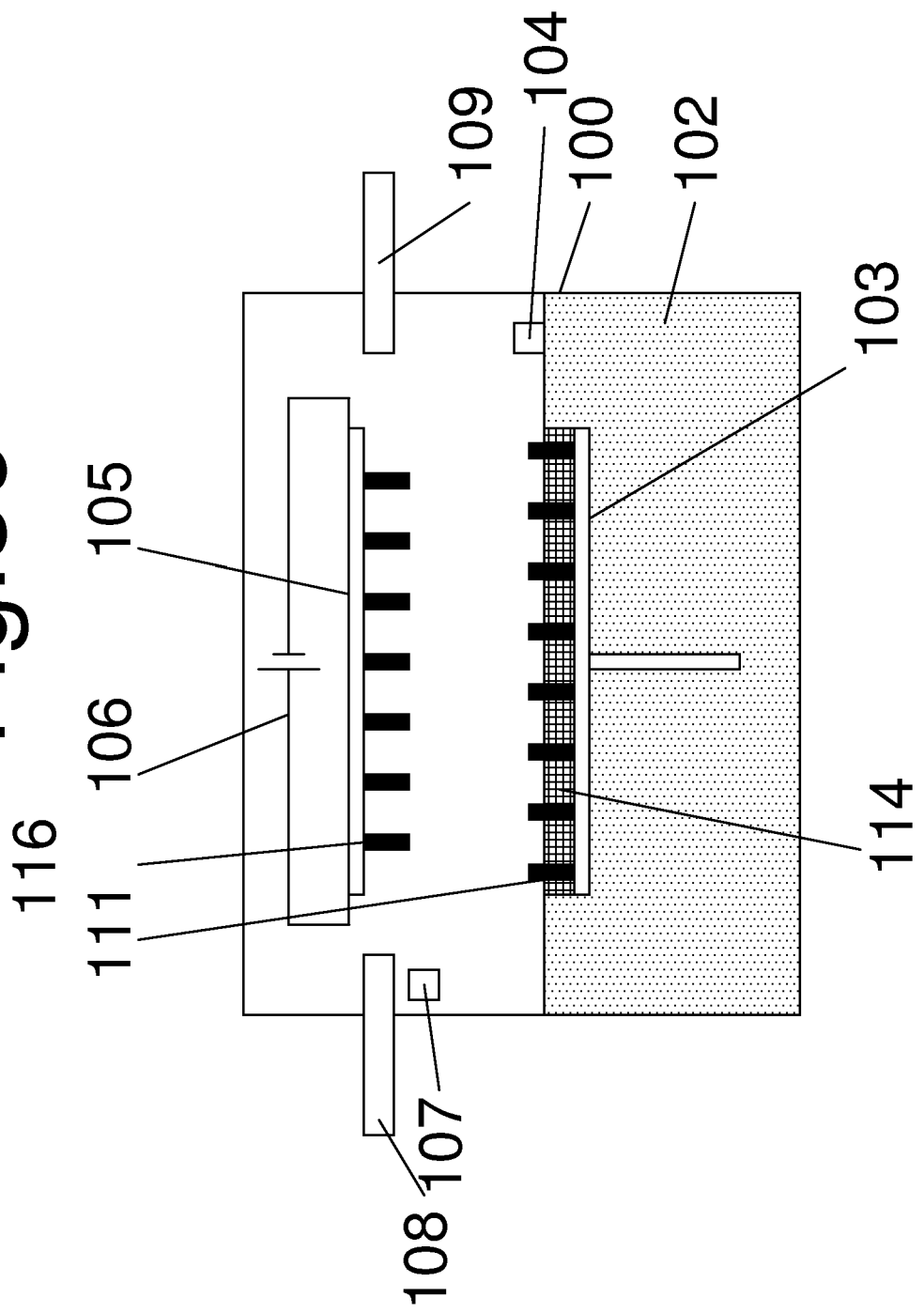
Figure 37:
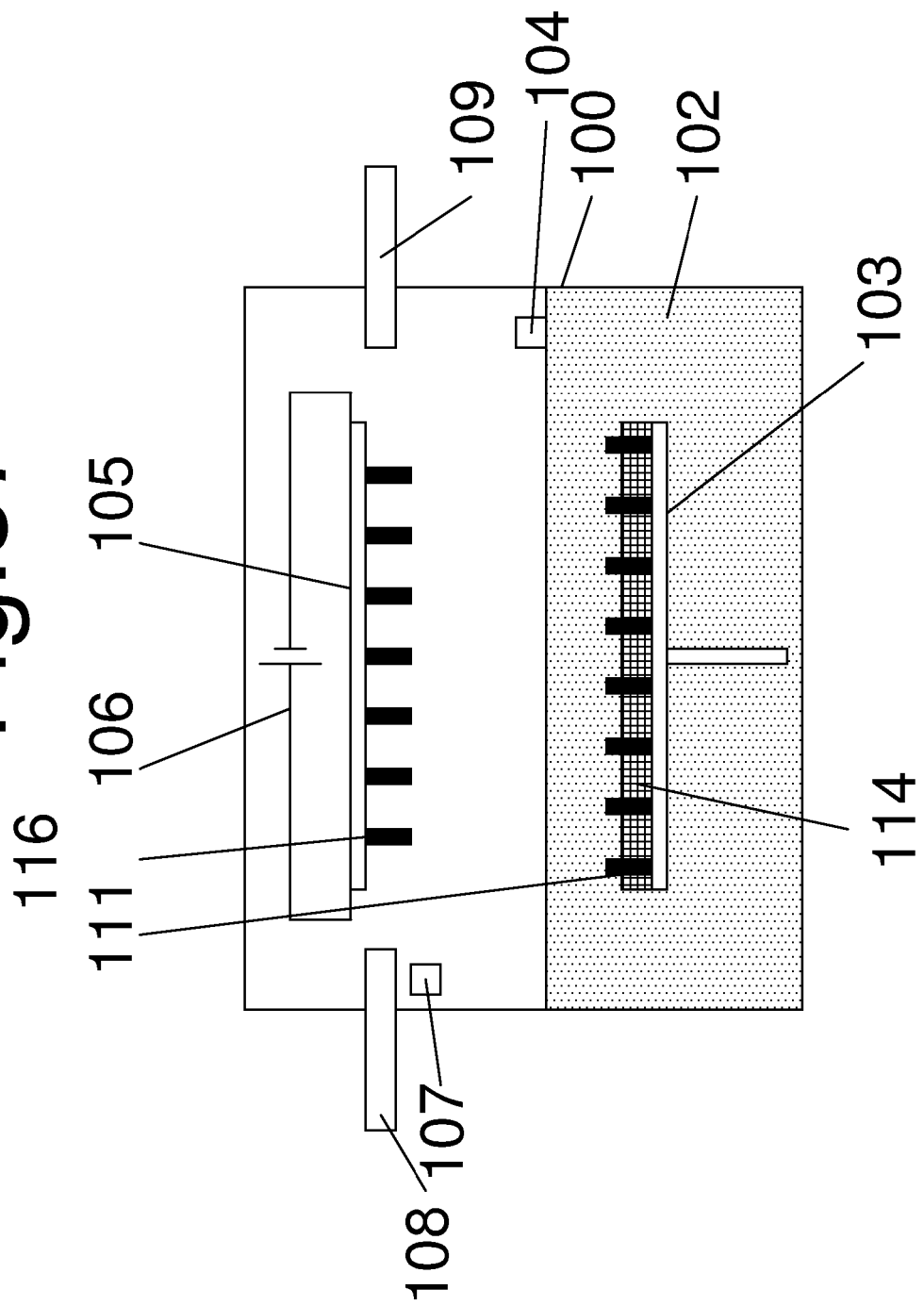
Figure 38:
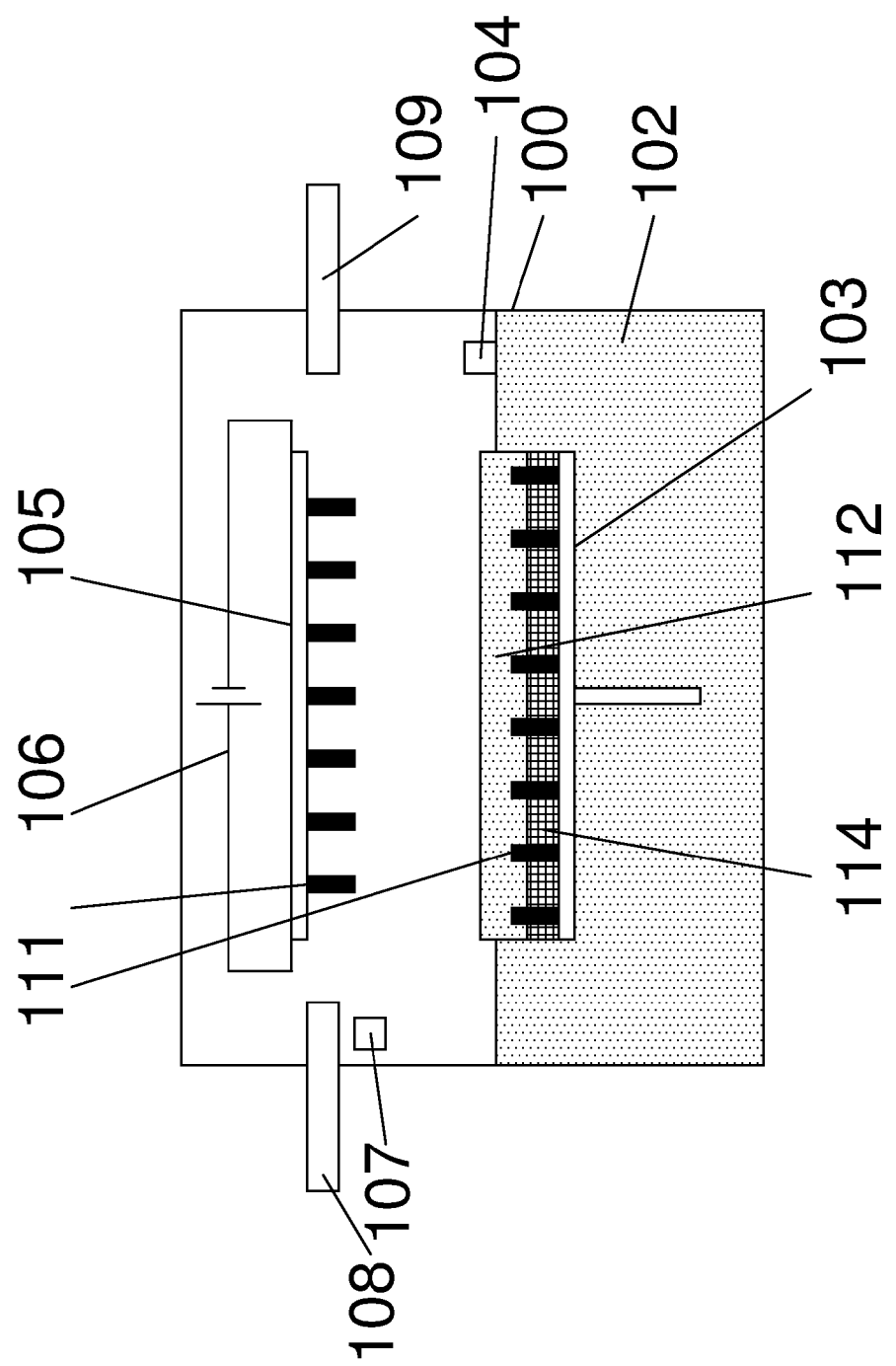

In FIG. 32 the substrate 105 is withdrawn. High adhesion forces between the CNTs 11 and the cured resin layer 114 mean that the CNTs are detached from the substrate 105 and remain in place in the cured resin layer 114.

The steps shown in FIGS. 24-32 are then repeated as shown in FIGS. 33-42 to produce a second layer of CNTs 116 embedded in a second cured resin layer 119.

Note that as the substrate 105 is moved down as shown in FIG. 40, the CNTs 116 dip into the liquid resin 113 as they penetrate the interstitial gaps between the CNTs 111.

FIG. 43 illustrates an alternative apparatus similar to the apparatus shown in FIG. 1, but in this case a single ALM chamber 200 is serviced by a stack of CVD-CNT chambers 201. Layers of CNTs are grown simultaneously in the CVD-CNT chambers 201 and transferred one after the other to the ALM chamber 200 when required. This maximises the speed of the method in the event that the CNT growth is relatively slow.

Although the invention has been described above with reference to one or more preferred embodiments, it will be appreciated that various changes or modifications may be made without departing from the scope of the invention as defined in the appended claims.

The invention claimed is:

1. A method of manufacturing a composite material, the method comprising the steps of:
   providing a first layer of reinforcement elements with liquid matrix material in interstitial gaps between the reinforcement elements, said first layer extending in a plane and comprising fibers extending at an angle of ranging from 45 to 90 degrees with respect to the plane of the first layer;
   dipping a second layer of reinforcement elements into the liquid matrix material in the interstitial gaps such that the reinforcement elements in the second layer become partially embedded in the first layer of reinforcement elements and partially protrude from the first layer of reinforcement elements;
   curing the liquid matrix material.

2. The method of claim 1 further comprising suspending the second layer of reinforcement elements from a transfer body as they are dipped into the liquid matrix material; and detaching the transfer body from the second layer of reinforcement elements after they have been dipped into the liquid matrix material.

3. The method of claim 2 wherein the transfer body is detached from the second layer of reinforcement elements after the liquid matrix material in the interstitial gaps has been cured.

4. The method of claim 3 wherein the liquid matrix material in the interstitial gaps is cured by heating the transfer body.

5. The method of claim 2 further comprising growing the second layer of reinforcement elements on the transfer body.

6. The method of claim 1 wherein the liquid matrix material is cured by exposure to electromagnetic radiation.

7. The method of claim 6 wherein the liquid matrix material is exposed to electromagnetic radiation by scanning a radiation beam across it.

8. The method of claim 1 further comprising fabricating at least two of the layers of reinforcement elements simultaneously.

9. The method of claim 1 further comprising fabricating each layer of reinforcement elements by growing the reinforcement elements.

10. The method of claim 9 wherein each layer is grown by locally heating a substrate; and growing the layer of reinforcement elements on the substrate.

11. The method of claim 1 wherein the reinforcing elements of the first layer define a first plane, the reinforcing elements of the second layer define a second plane, the reinforcement elements of the first layer extend in a direction which is not parallel with the first plane, and the reinforcement elements of the second layer extend in a plane which is not parallel with the second plane.

12. The method of claim 1, wherein the second layer of reinforcement elements have tips which are dipped into the liquid matrix material, and wherein capillary action causes the liquid matrix material to wick upwards above the tips of the second layer of reinforcement elements.

13. The method of claim 1, wherein the first and second reinforcement elements comprise carbon nanotubes.

14. The method of claim 1, further comprising impregnating the protruding parts of the reinforcement elements in the second layer with liquid matrix material.

15. The method of claim 14 wherein the liquid matrix material in the interstitial gaps is cured before the protruding parts of the reinforcement elements in the second layer are impregnated with liquid matrix material.

16. The method of claim 14 further comprising adding one or more additional layers of reinforcement elements, each layer being added by dipping the additional layer into liquid matrix material in interstitial gaps of a preceding layer such that the reinforcement elements in the additional layer become partially embedded in the preceding layer of reinforcement elements and partially protrude from the preceding layer of reinforcement elements, impregnating the protruding parts of the reinforcement elements in the additional layer with liquid matrix material; and curing the liquid matrix material.

17. The method of claim 14
   wherein the liquid matrix material is cured as a series of layers, each layer being cured at a different time.

* * * * *